US010140865B2

(12) United States Patent
Hu et al.

(10) Patent No.: US 10,140,865 B2
(45) Date of Patent: Nov. 27, 2018

(54) SYSTEMS AND METHODS FOR DETERMINING A PARKING REGION OF VEHICLES

(71) Applicant: DONGXIA DATONG (BEIJING) MANAGEMENT AND CONSULTING CO., LTD., Beijing (CN)

(72) Inventors: Zhifeng Hu, Beijing (CN); Wei Duan, Beijing (CN)

(73) Assignee: DONGXIA DATONG (BEIJING) MANAGEMENT AND CONSULTING CO., LTD., Beijing (CN)

( * ) Notice: Subject to any disclaimer, the term of this patent is extended or adjusted under 35 U.S.C. 154(b) by 0 days.

(21) Appl. No.: 15/843,928

(22) Filed: Dec. 15, 2017

(65) Prior Publication Data
US 2018/0286237 A1   Oct. 4, 2018

(30) Foreign Application Priority Data

Apr. 1, 2017   (CN) .......................... 2017 1 0214197
Apr. 1, 2017   (CN) ..................... 2017 2 0345204 U

(51) Int. Cl.
  *G08G 1/123*   (2006.01)
  *G08G 1/14*    (2006.01)
  (Continued)

(52) U.S. Cl.
  CPC ......... *G08G 1/144* (2013.01); *G01C 21/3685* (2013.01); *G08G 1/123* (2013.01);
  (Continued)

(58) Field of Classification Search
  CPC ........ G08G 1/123; G08G 1/144; G08G 1/146; G08G 1/147; G08G 1/205; H04W 4/02;
  (Continued)

(56) References Cited

U.S. PATENT DOCUMENTS 7,253,747 B2 * 8/2007 Noguchi ................. G08G 1/14
                                                   701/13
8,972,178 B2 * 3/2015 Windeler et al. ...... G08G 1/144
                                                  701/454
(Continued)

FOREIGN PATENT DOCUMENTS

CN      104853050 A      8/2015
CN      105046827 A     11/2015
(Continued)

OTHER PUBLICATIONS

International Search Report in PCT/CN2017/112957 dated Feb. 26, 2018, 4 pages.
(Continued)

*Primary Examiner* — Dale W Hilgendorf
(74) *Attorney, Agent, or Firm* — Metis IP LLC

(57) ABSTRACT

A system may include a storage device that stores a set of instructions and a processor in communication with the storage device. When executing the set of instructions, the processor may be configured to cause the system to obtain, from a user terminal, a first geographical location via a network and obtain a second geographical location associated with a virtual parking region. The first geographical location may be determined by the user terminal according a GPS signal. The virtual parking region may include parking space for vehicles. The processor may also be configured to cause the system to determine whether a distance between the first geographical location and the second geographical location is less than a threshold and obtain information associated with the virtual parking region in response to the determination that the distance is less than the threshold.

20 Claims, 9 Drawing Sheets

(51) Int. Cl.
  *G08G 1/00* (2006.01)
  *H04W 4/02* (2018.01)
  *H04W 4/029* (2018.01)
  *G01C 21/36* (2006.01)
  *H04W 4/021* (2018.01)

(52) U.S. Cl.
  CPC ............. *G08G 1/146* (2013.01); *G08G 1/147* (2013.01); *G08G 1/205* (2013.01); *H04W 4/02* (2013.01); *H04W 4/021* (2013.01); *H04W 4/029* (2018.02)

(58) Field of Classification Search
  CPC ... H04W 4/021; H04W 4/046; G01C 21/3685
  See application file for complete search history.

(56) References Cited

U.S. PATENT DOCUMENTS

2012/0239248 A1* 9/2012 Bobbitt .................. G08G 1/127
                                                   701/36
2015/0343993 A1* 12/2015 Ferrieres et al. ....... H04L 63/08
                                                   701/2
2016/0133133 A1* 5/2016 Triplett ...................... 340/932.2
2016/0189435 A1* 6/2016 Beaurepaire ........... G08G 1/144
                                                   701/23
2016/0321771 A1* 11/2016 Liu et al. ........... G01C 21/3438
2017/0206786 A1* 7/2017 Dhondse et al. ...... G08G 1/147
2017/0316534 A1* 11/2017 Hirose et al. .......... G06Q 50/30

FOREIGN PATENT DOCUMENTS

| | | |
|---|---|---|
| CN | 105976528 A | 9/2016 |
| CN | 106251495 A | 12/2016 |
| CN | 106803355 A | 6/2017 |
| JP | 2002175589 A | 6/2002 |

OTHER PUBLICATIONS

Written Opinion in PCT/CN2017/112957 dated Feb. 26, 2018, 5 pages.

* cited by examiner

SYSTEMS AND METHODS FOR DETERMINING A PARKING REGION OF VEHICLES

CROSS-REFERENCE TO RELATED APPLICATIONS

This application claims priority of Chinese Application No. 201710214197.2, filed on Apr. 1, 2017, and Chinese Application No. 201720345204.8, filed on Apr. 1, 2017. The disclosures of the above-referenced applications are expressly incorporated herein by reference in their entirety.

TECHNICAL FIELD

The present disclosure generally relates to a vehicle sharing system, and more particularly, relates to systems and methods for determining a parking region of vehicles.

BACKGROUND

Vehicle sharing provides a convenient service for people and becomes more and more popular. With the increase in the number of vehicles (e.g., bicycles, cars, electric bicycles, or power assisted bicycles) distributed in a city, the parking of the vehicles becomes an emerging problem. Meanwhile, when a user needs a vehicle for a ride, locating a vehicle near the user may be important. It may be desirable to provide systems and methods for controlling the parking of the vehicles and providing a vehicle to the user efficiently.

SUMMARY

According to an aspect of the present disclosure, a system is provided. The system may include a storage device that stores a set of instructions, and a processor in communication with the storage device. When executing the set of instructions, the processor may be configured to cause the system to obtain, from a user terminal, a first geographical location via a network. The processor may also be configured to cause the system to obtain a second geographical location associated with a virtual parking region and determine whether the first geographical location and the second geographical location meet a criterion. The processor may further be configured to cause the system to, in response to a result of the determination that the first geographical location and the second geographical location meet the criterion, obtain information associated with the virtual parking region. The processor may also be configured to cause the system to transmit, via the network, the information associated with the virtual parking region to the user terminal. The virtual parking region may include parking space for vehicles.

In some embodiments, the user terminal may include a first positioning unit, and the processor may further be configured to cause the system to obtain the first geographical location determined by the first positioning unit from the user terminal.

In some embodiments, the second geographical location may include a location of at least one part of the virtual parking region pre-stored in the storage.

In some embodiments, the virtual parking region may include a second positioning unit, and the second geographical location may include a geographical location of at least one part of the virtual parking region that is determined by the second positioning unit.

In some embodiments, the information associated with the virtual parking region may include information relating to the parking space in the virtual parking region. The information relating to the parking space in the virtual parking region may include at least one of the number of vehicles in the virtual parking region, a location of at least one of vehicles in the virtual parking region, the amount of parking space, or a location of parking space in the virtual parking region.

In some embodiments, the criterion may be that a distance between the first geographical location and the second geographical location is less than a threshold distance.

In some embodiments, the processor may further be configured to cause the system to transmit the information relating to the parking space in the virtual parking region to a working staff.

In some embodiments, the processor may further be configured to cause the system to modify the virtual parking region by adjusting at least one of its boundary, size, or location.

In some embodiments, the processor may further be configured to cause the system to obtain at least one environmental parameter relating to the virtual parking region. The processor may further be configured to cause the system to generate environmental information based on the at least one environmental parameter; and transmit, via the network, the environmental information to the user terminal.

According to another aspect of the present disclosure, a method for determining a parking region of vehicles is provided. The method may be implemented on at least one machine each of which includes a storage device and a processor. The method may include obtaining, by the processor, a first geographical location from a user terminal via a network. The method may also include obtaining, by the processor, a second geographical location associated with a virtual parking region. The method may also include determining, by the processor, whether the first geographical location and the second geographical location meet a criterion. The method may also include, in response to a result of the determination that the first geographical location and the second geographical location meet the criterion, obtaining, by the processor, information associated with the virtual parking region. The method may further include transmitting, by the processor, the information associated with the virtual parking region to the user terminal via the network. In some embodiments, the virtual parking region may include parking space for vehicles.

According to yet another aspect of the present disclosure, a non-transitory computer-readable medium embodying a computer program product is provided. The computer program product may include instructions configured to cause a computing device to obtain, from a user terminal, a first geographical location via a network. The instructions may also be configured to cause the computing device to obtain a second geographical location associated with a virtual parking region. The instructions may also be configured to cause the computing device to determine whether the first geographical location and the second geographical location meet a criterion. The instructions may also be configured to cause the computing device to, in response to a result of the determination that the first geographical location and the second geographical location meet the criterion, obtain information associated with the virtual parking region. The instructions may further be configured to cause the computing device to and transmit, via the network, the information associated with the virtual parking region to the user terminal. In some embodiments, the virtual parking region may include parking space for vehicles.

According to yet another aspect of the present disclosure, a virtual parking system is provided. The virtual parking system may include a storage device that stores a set of instructions and a processor in communication with the storage device. When executing the set of instructions, the processor may be configured to cause the system to acquire a first geographical location associated with a virtual parking region. The processor may also be configured to cause the system to acquire, from a user terminal, a second geographical location via a communication unit of the virtual parking region. The processor may also be configured to cause the system to determine whether a distance between the first geographical location and the second geographical location is less than a threshold distance. The processor may also be configured to cause the system to, in response to a result of the determination that the distance is less than the threshold distance, transmit, via the communication unit, information associated with the virtual parking region to the user terminal. In some embodiments, the virtual parking region may include parking space for vehicles.

In some embodiments, the processor may further be configured to cause the system to, in response to a result of the determination that the distance is less than the threshold distance, display, via a 3D holographic projector, the information associated with the virtual parking region.

In some embodiments, the processor may further be configured to cause the system to supply power to the vehicles or the user terminal.

According to yet another aspect of the present disclosure, a method for transmitting information associated with a parking region of vehicles to a user terminal is provided. The method may be implemented on at least one machine each of which includes a storage device and a processor. The method may include acquiring, by the processor, a first geographical location associated with a virtual parking region. The method may also include acquiring, by the processor, a second geographical location from a user terminal via a communication unit of the virtual parking region. The method may also include determining, by the processor, whether a distance between the first geographical location and the second geographical location is less than a threshold distance. The method may further include, in response to a result of the determination that the distance is less than the threshold distance, transmitting, by the processor, information associated with the virtual parking region to the user terminal via the communication unit. In some embodiments, the virtual parking region may include parking space for vehicles.

According to yet another aspect of the present disclosure, a non-transitory computer-readable medium embodying a computer program product is provided. The computer program product may include instructions configured to cause a computing device to acquire a first geographical location associated with a virtual parking region. The instructions may also be configured to cause the computing device to acquire, from a user terminal, a second geographical location via a communication unit of the virtual parking region. The instructions may also be configured to cause the computing device to determine whether a distance between the first geographical location and the second geographical location is less than a threshold distance. The instructions may also be configured to cause the computing device to, in response to a result of the determination that the distance is less than the threshold distance, transmit, via the communication unit, information associated with the virtual parking region to the user terminal. In some embodiments, the virtual parking region may include parking space for vehicles.

According to yet another aspect of the present disclosure, a vehicle having a lock is provided. The vehicle may include a storage component that stores a set of instructions and a processing component in communication with the storage component. When executing the set of instructions, the processing component may be configured to cause the vehicle to position, by a positioning component, a first geographical location of the vehicle. The processing component may also be configured to cause the vehicle to transmit, by a communication component, the first geographical location of the vehicle to a server. The processing component may also be configured to cause the vehicle to obtain, by the communication component, from the server, information relating that a distance between the first geographical location of the vehicle and a second geographical location of a user terminal or a virtual parking region meets a criterion. The processing component may further be configured to cause the vehicle to transmit, by the communication component, to the user terminal or the virtual parking region at least one of information associated with the vehicle, information associated with the user terminal or the virtual parking region, environmental information, or advertisement information.

In some embodiments, the criterion may include the distance between the first geographical location of the vehicle and the second geographical location of the user terminal or the virtual parking region is less than a threshold distance.

According to yet another aspect of the present disclosure, a method is provided. The method may be implemented on a least one vehicle each of which has a storage component and a processing component. The method may include positioning, by a positioning component, a first geographical location of the vehicle. The method may also include transmitting, by a communication component, the first geographical location of the vehicle to a server. The method may also obtaining, by the communication component, from the server, information indicating that a distance between the first geographical location of the vehicle and a second geographical location of a user terminal or a virtual parking region meets a criterion. The method may further include transmitting, to the user terminal or the virtual parking region at least one of information associated with the vehicle, information associated with the user terminal or the virtual parking region, environmental information, or advertisement information.

According to yet another aspect of the present disclosure, a non-transitory computer-readable medium embodying a computer program product is provided. The computer program product may include instructions configured to cause a vehicle to position, by a positioning component, a first geographical location of the vehicle. The instructions may also be configured to cause the vehicle to transmit, by a communication component, the first geographical location of the vehicle to a server. The instructions may also be configured to cause the vehicle to obtain, by the communication component, from the server, information relating that a distance between the first geographical location of the vehicle and a second geographical location of a user terminal or a virtual parking region meets a criterion. The instructions may further be configured to cause the vehicle to transmit, by the communication component, to the user terminal or the virtual parking region at least one of information associated with the user terminal or the virtual parking region, environmental information, or advertisement information.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
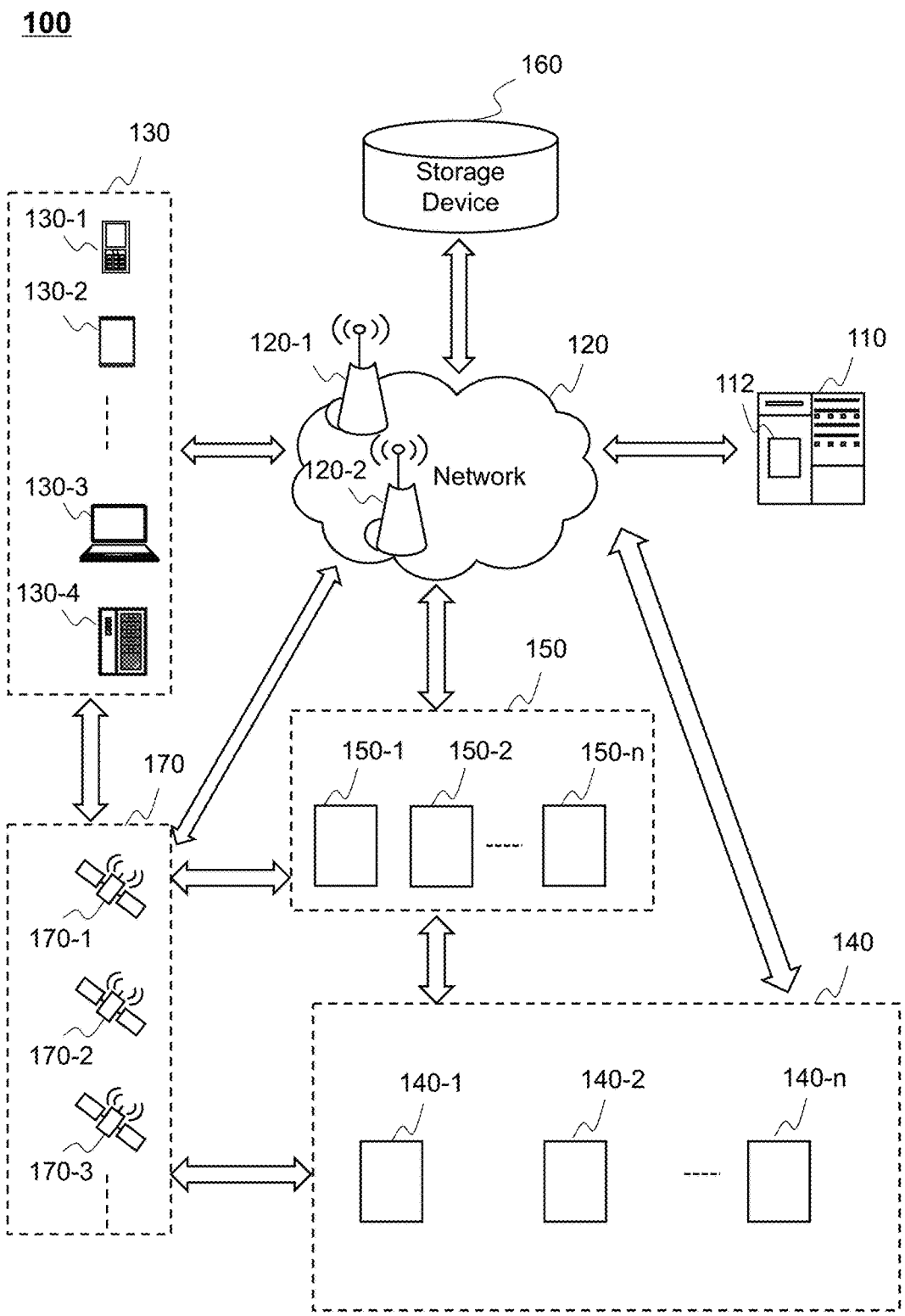
FIG. 1 is a schematic diagram illustrating an exemplary device sharing system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is to describe particular exemplary embodiments only and is not intended to be limiting. As used herein, the singular forms "a," "an," and "the" may be intended to include the plural forms as well, unless the context expressly indicates otherwise. It will be further understood that the terms "comprise," "comprises," and/or "comprising," "include," "includes," and/or "including," when used in the present disclosure, specify presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of the present disclosure. It is to be expressly understood, however, that the drawings are for illustration and description only and are not intended to limit the scope of the present disclosure. It is understood that the drawings are not to scale.

It will be understood that the term "system," "engine," "unit," and/or "module" used herein are one method to distinguish different components, elements, parts, sections, or assemblies of different levels in ascending order. However, the terms may be displaced by other expressions if they achieve the same purpose.

It will be understood that when a unit, engine, or module is referred to as being "on," "connected to," or "coupled to," another unit, engine, or module, it may be directly on, connected or coupled to, or communicate with the other unit, engine, or module, or an intervening unit, engine, or module may be present, unless the context clearly indicates otherwise. As used herein, the term "and/or" includes any and all combinations of one or more of the associated listed items.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Moreover, while the systems and methods described in the present disclosure are described primarily regarding a device sharing service, it should also be understood that they are merely exemplary embodiments. The systems or methods described in the present disclosure may apply to any other kind of economic sharing service that transfers a usufruct from one to another in an online rental transaction. For example, the systems or methods of the present disclosure may apply to physical asset renting and/or a labor service. The physical asset may include real estate (e.g., a hotel, a room, or an apartment), vehicles (e.g., a car, a bicycle, an electric bicycle, a bus, a hot-air balloon, or an airplane), goods (e.g., clothes, an umbrella, a charger, or a microphone), etc. The labor service may include pet adoption, housekeeping, designated driving, etc. The application of the systems or methods of the present disclosure may include a web page, a plug-in for a browser, a client terminal, a custom system, an internal analysis system, an artificial intelligence robot, or the like, or any combination thereof.

The terms "requestor," "service requestor," "vehicle terminal," "requestor terminal," and "user" in the present disclosure are used interchangeably to refer to an individual, an entity, or a tool that may request or order a vehicle sharing service.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WIFI) positioning technology, or the like, or any combination thereof. One or more of the above positioning systems may be used interchangeably in the present disclosure.

It should be noted that the device sharing service is a new form of service rooted only in post-Internet era. It provides technical solutions to users and service providers that could raise only in the post-Internet era. In the pre-Internet era, when a user needs to rent a device (e.g., a car, a bicycle, an electric bicycle, or a power assisted bicycle) in a device rental shop, the device request and acceptance occur only between the user and a shopkeeper of the device rental shop who meet each other at a physical place. Through the Internet (and/or other types of network technology like-BLUETOOTH), the device sharing service, however, allows a user of the service to acquire a location of a device accurately and rent a device anywhere and anytime. It also allows the user to place the device in any area where the placement of the device is allowed. For example, the user may park a vehicle in any area where the parking of the vehicle is allowed. Therefore, through the Internet, a device sharing system may provide a more convenient transaction platform for users and service providers that may never meet in the settings of the traditional, pre-Internet vehicle service.

An aspect of the present disclosure relates to systems and methods for determining a virtual parking region of vehicles (e.g., cars, bicycles, electric bicycles, or power assisted bicycles). According to the present disclosure, the systems and methods may obtain a first geographical location from a user terminal via a network. The systems and methods may obtain a second geographical location associated with a virtual parking region. The virtual parking region may include parking space for vehicles. The systems and methods may also determine whether the first geographical location and the second geographical location meet a criterion. In response to a result of the determination that the first geographical location and the second geographical location meet the criterion, the systems and methods may obtain information associated with the virtual parking region. The systems and methods may also transmit the information associated with the virtual parking region to the user terminal via the network.

Another aspect of the present disclosure relates to systems and methods for transmitting information associated with a parking region of vehicles (e.g., cars, bicycles, electric bicycles, or power assisted bicycles) to a user terminal. According to the present disclosure, the systems and methods may acquire a first geographical location associated with a virtual parking region. The systems and methods may acquire a second geographical location from a user terminal via a communication unit of the virtual parking region. The systems and methods may determine whether a distance between the first geographical location and the second geographical location is less than a threshold distance. In response to a result of the determination that the distance is less than the threshold distance, the systems and methods may transmit information associated with the virtual parking region to the user terminal via the communication unit.

Yet another aspect of the present disclosure relates to vehicles and methods for exchanging information between vehicles (e.g., cars, bicycles, electric bicycles, or power assisted bicycles) to a user terminal or a virtual parking region. According to the present disclosure, the vehicles and methods may position, by a positioning component, a first geographical location of the vehicle. The vehicles and methods may also transmit, by a communication component, the first geographical location of the vehicle to a server. The vehicles and methods may also obtain, by the communication component, from the server, information indicating that a distance between the first geographical location of the vehicle and a second geographical location of a user terminal or a virtual parking region meets a criterion. The vehicles and methods may further transmit, by the communication component, to user terminal or the virtual parking region at least one of information associated with the vehicle, information associated with the user terminal or the virtual parking region, environmental information, or advertisement information.

FIG. 1 is a schematic diagram illustrating an exemplary device sharing system according to some embodiments of the present disclosure. The device sharing system 100 may include a server 110, a network 120, one or more terminal devices 130, one or more devices 140, a virtual parking region 150, a storage device 160, and a positioning device 170. In some embodiments, the device sharing system 100 may provide a vehicle sharing service (e.g., a bicycle sharing system) allowing a user to use a vehicle (e.g., a bicycle) for a ride. When the user finishes the ride and wants to return the vehicle, the user may leave the vehicle in an area where the parking of the vehicle is allowed. The vehicle may then be ready for a next user.

The server 110 may communicate with the terminal device 130, the device 140 and/or the virtual parking region 150 to provide various functionalities of the device sharing service. In some embodiments, the server 110 may receive a service request from the terminal device 130 via, for example, the network 120. For example, the device 140 may be a vehicle (e.g., a bicycle, a car, an electric bicycle, or a power assisted bicycle) in a vehicle sharing system. The service request may include order information relating to the ride and/or the vehicle, including, for example, a vehicle type, a departing place, a destination, mileage, a route, or the like, or any combination thereof. The service request may also include the information relating the user (e.g., the user account information) and/or the terminal device 130 (e.g., the location of the terminal device 130). The service request may further include an instruction to use (and/or open a lock of) the vehicle, or an instruction to return (and/or lock) the vehicle. As another example, the server 110 may receive information from the virtual parking region 150 via, for example, the network 120. The information may include the information relating to the geographical location of the virtual parking region 150, the environmental parameters relating to the virtual parking region 150, etc. The environmental parameters may include a temperature parameter, a humidity parameter, a wind parameter, a dust parameter, or the like, or any combination thereof. As yet another example, the server 110 may receive geographical locations of the one or more devices 140 from the one or more devices 140. The server 110 may determine the distribution of the one or more devices 140 in an area (e.g., the number of the one or more devices in the area) based on the geographical locations of the one or more devices.

The server 110 may also transmit information to the terminal device 130, the device 140 and/or the virtual parking region 150. For instance, the server 110 may transmit to the device 140 an instruction to lock the device 140, and instruction to unlock the device 140, and/or the information related to the device 140 (e.g., the information indicating whether the device 140 is locked, the information indicating that the device 140 is out of range, or navigation information).

In some embodiments, the device 140 may be a vehicle in a vehicle sharing system. The server 110 may determine one or more vehicles in response to a service request received from the terminal device 130. The server 110 may also transmit the information relating to the one or more vehicles to the terminal device 130, including, for example, the locations of the one or more vehicles, the fees for the ride (e.g., the total fees for the ride, the hourly rate for the ride), or the like, or a combination thereof.

In some embodiments, the server 110 may be a single server or a server group. The server group may be a centralized server group connected to the network 120 via an access point or a distributed server group connected to the network 120 via one or more access points, respectively. In some embodiments, the server 110 may be locally connected to the network 120 or in remote connection with the network 120. For example, the server 110 may access information and/or data stored in the terminal device 130, the device 140, and/or the virtual parking region 150 via the network 120. As another example, the storage device 160 may serve as backend data storage of the server 110. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the server 110 may include a processing engine 112. The processing engine 112 may process information and/or data related to performing one or more functions in the present disclosure. For example, the processing engine 112 may obtain a geographical location associated with a virtual parking region (e.g., the virtual parking region 150). In some embodiments, the processing engine 112 may include one or more processing units (e.g., single-core processing engine(s) or multi-core processing engine(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the device sharing system 100 (e.g., the server 110, the terminal device 130, the device 140, the virtual parking region 150, or the storage device 160) may transmit information and/or data to another component(s) in the device sharing system 100 via the network 120. For example, the server 110 may access and/or obtain data of a plurality of devices 140 from the storage device 160 via the network 120. As another example, the server 110 may transmit, via the network 120, the distribution of devices 140 near the location of the terminal device 130 to the terminal device 130. The server 110 may also transmit, via the network 120, the distribution of virtual parking regions 150 near the location of the terminal device 130 to the terminal device 130. As yet another example, the positioning device 170 may transmit positioning information to the terminal device 130 via the network 120.

In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a BLUETOOTH network, a ZIGBEE network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the device sharing system 100 may be connected to the network 120 to exchange data and/or information.

In some embodiments, a user may be an owner of the terminal device 130. The terminal device 130 may receive input from the user and transmit the information relating to the input to the server 110 via the network 120. The terminal device 130 may also receive information from the server 110 via the network 120. For example, the terminal device 130 may receive input from the user relating to the device 140 to the server 110, receive a service confirmation, and/or information or instructions from the server 110.

In some embodiments, the device 140 may be a vehicle (e.g., a bicycle, a car, an electric bicycle, or a power assisted bicycle) in a vehicle sharing system. The terminal device 130 may be configured to transmit a service request to the server 110 for searching for a vehicle near the location of the terminal device 130. The server 110 may determine one or more vehicles (e.g., the locations of the vehicles, number of the vehicles) near the location of the terminal device 130 according to and in response to the service request. The server 110 may also transmit information relating to the determined one or more vehicles to the terminal device 130 via the network 120. The information of the determined one or more vehicles may be displayed on the terminal device 130. For example, points indicating the vehicles, which may be associated with an electronic map, may be displayed on the terminal device 130. The terminal device 130 may receive input from the user for selecting a vehicle among the vehicles displayed on the terminal device 130. The terminal device 130 may transmit the information indicating the selected vehicle to the server 110. The terminal device 130 may also provide a turn-by-turn navigation for guiding the user to the location of the selected vehicle. As another example, the terminal device 130 may receive input from the user for reserving a vehicle and transmit the information to the server 110. As yet another example, the terminal device 130 may transmit feedback information provided by the user to the server 110. The feedback information may include the status of the vehicle (e.g., whether any part of the vehicle needs to be repaired), improvement suggestions, etc.

In some embodiments, the terminal device 130 may include a mobile device 130-1, a tablet computer 130-2, a laptop computer 130-3, a built-in device in a vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electronic apparatus, a smart monitoring device, a smart television, a smart video camera, an interphone, or the like, or any combination thereof. In some embodiments, the wearable device may include a smart bracelet, a smart footgear, smart glass, a smart helmet, a smart watch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a Hololens™, a Gear VR™, etc. In some embodiments, a built-in device in the vehicle 130-4 may include a built-in computer, a built-in onboard television, a built-in tablet, etc. In some embodiments, the terminal device 130 may include a signal transmitter and a signal receiver configured to communicate with the positioning device 170 for locating the position of the user and/or the terminal device 130. For example, the terminal device 130 may transmit an instruction to the positioning device 170 to locate the position of the user and/or the terminal device 130.

The device 140 may include any device in a device sharing system. Exemplary device 140 may include a vehicle (e.g., a bicycle, a car, an electric bicycle, a power assisted bicycle, a bus, a hot-air balloon, or an airplane), goods (e.g., clothes, an umbrella, a charger, or a microphone), or the like, or any combination thereof.

The device 140 may communicate with the server 110, the terminal device 130, the virtual parking region 150, and/or the positioning device 170. For example, the device 140 may transmit status information of the device 140 to the server 110 via the network 120. The status information may include a location of the device 140, a locked/unlocked status of the device 140, battery level of the device 140, battery level of the lock 410 of the device 140 (e.g., battery power of the lock of a bicycle), or the like, or a combination thereof. The server 110 may monitor the device 140 based on the status information. As another example, the device 140 may receive an instruction (e.g., an instruction to lock/unlock the device 140) from the terminal device 130 and/or the server 110. As yet another example, the device 140 may include a signal transmitter and a signal receiver (e.g., a GPS component of the device 140) configured to communicate with the positioning device 170 for locating a position of the device 140.

The device 140 may include a plurality of devices 140-1, 140-2, . . . , 140-n. In some embodiments, the device 140 may be a vehicle. The vehicle may be any type of vehicle including, for example, a car, a unicycle, a bicycle, a tricycle, a tandem, a motor bicycle, an electric bicycle, a power assisted bicycle, a moped, etc. The color of a vehicle is not limiting. Merely by way of example, the color of the body of the vehicle may be yellow. In some embodiments, a vehicle may be identified with a unique symbol. The unique symbol may include a bar code, a quick response (QR) code, a serial number including letters and/or digits, or the like, or any combination thereof. For example, the identification (ID) of the vehicle may be obtained by scanning the QR code of the vehicle through a mobile application of the terminal device 130 or a camera of the terminal device 130 (if any). Merely by way of example, the ID of the vehicle may be obtained by scanning the QR code of the vehicle through a camera of an IPHONE.

The virtual parking region 150 may be a region configured to provide a holding area for the device 140. The virtual parking region 150 may include a plurality of virtual parking regions 150-1, 150-2, . . . , 150-n. In some embodiments, the device 140 may be a vehicle in a vehicle sharing system. The virtual parking region 150 may be a region configured to park vehicles. The virtual parking region 150 may include parking space for parking of the vehicles. The parking space may include designated parking space or non-designated parking space or a combination thereof. The designated parking space may include parking lots for the parking of the vehicles. The non-designated parking space may include no parking lot, and a vehicle may be parked anywhere in the non-designated parking space. For example, the virtual parking region 150 may include one or more parking lots for parking of bicycles. A bicycle may be locked into one of the parking lots. Alternatively or additionally, the virtual parking region 150 may include a region with no parking lot. The bicycles may be parked anywhere in the region. In some embodiments, the virtual parking region 150 may include a boundary line configured to define the border of the virtual parking region 150. The virtual parking region 150 defined by the boundary line may have a shape including, for example, a triangle, a rectangle, a circle, an oval, a sector, an irregular shape, or the like, or any combination thereof.

The virtual parking region 150 may communicate with the server 110, the network 120, the terminal device 130, the device 140, and/or the positioning device 170. For example, the virtual parking region 150 may include a positioning unit 510 configured to communicate with the positioning device 170 for locating a position of the positioning unit 510. The virtual parking region 150 may transmit the position of the positioning unit 510 of the virtual parking region 150 to the server 110 via, for example, the network 120. As another example, the server 110 may determine a geographical location associated with the virtual parking region 150 based on location information of one or more devices 140 located in the virtual parking region 150. The server 110 may receive the location information from the one or more devices 140 via, for example, the network 120. The server 110 may then determine the geographical location associated with the virtual parking region 150 based on the location information of the one or more devices 140. As yet another example, the virtual parking region 150 may include a communication component 520 illustrated in FIG. 5. The communication component 520 may transmit information (e.g., advertisements) to the terminal device 130. In some embodiments, the virtual parking region 150 may include a positioning component 510 illustrated in FIG. 5. The positioning component 510 may communicate with the device 140 to locate the geographical location of the device 140 based on a BLUETOOTH positioning technology.

The storage device 160 may be configured to store data and/or instructions. The data may include data related to users, terminal devices 130, devices 140, etc. Merely by way of example, the device 140 may be a vehicle in a vehicle sharing system. The data related to the users may include user profiles including for example, names of the users, mobile numbers of the users, ID numbers of the users, types of the users (e.g., annual card users, quarterly card users, or monthly card users), usage records of the users (e.g., riding time, cost), credit rating of the users, historical routes, account balance, etc. The data related to the vehicles may include service conditions of the vehicles (an inactive state, a booking state, on a ride, in a maintenance state, in a loss state), positions of the vehicles, types of the vehicles (e.g., a car, a unicycle, a bicycle, a tricycle, a tandem, a motor bicycle, an electric bicycle), etc. In some embodiments, the storage device 160 may store data obtained from the terminal device 130 and/or the device 140. For example, the storage device 160 may store log information associated with the terminal device 130. In some embodiments, the storage device 160 may store data and/or instructions that the server 110 may execute or use to perform exemplary methods described in the present disclosure.

In some embodiments, the storage device 160 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the virtual parking region 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The positioning device 170 may determine information associated with an object, for example, one or more of the terminal device 130, the device 140, or the virtual parking region 150. For example, the positioning device 170 may determine a current time and a current location of the terminal device 130, the device 140 and/or the virtual parking region 150. In some embodiments, the positioning device 170 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, and/or a current time. The location may be in the form of coordinates, such as a latitude coordinate and a longitude coordinate, etc. The positioning device 170 may include one or more satellites, for example, a satellite 170-1, a satellite 170-2, and a satellite 170-3. The satellite 170-1 through 170-3 may determine the information mentioned above independently or jointly. The positioning device 170 may transmit the information mentioned above to the terminal device 130, the device 140, or the virtual parking region 150 via the network 120.

In some embodiments, one or more components of the device sharing system 100 may access the data and/or instructions stored in the storage device 160 via the network 120. In some embodiments, the storage device 160 may be directly connected to the server 110 as a backend storage. In some embodiments, one or more components of the device sharing system 100 (e.g., the server 110, the terminal device 130, or the device 140) may have permissions to access the storage device 160. In some embodiments, one or more components of the device sharing system 100 may read and/or modify the information related to the user, and/or the device 140 when one or more conditions are met. For example, the server 110 may read and/or modify one or more users' information after a ride of a vehicle is completed.

In some embodiments, the device 140 may be a vehicle in a vehicle sharing system. The information exchange between one or more components of the device sharing system 100 may be initiated by way of launching the mobile application of the vehicle sharing service on a terminal device 130, requesting a vehicle service, or inputting a query via the terminal device 130 (e.g., searching for a vehicle). The object of the service request may be any product. In some embodiments, the product may include food, medicine, commodity, chemical product, electrical appliance, clothing, car, housing, luxury, or the like, or any combination thereof. In some other embodiments, the product may include a service product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistant (PDA), a smart watch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application related to transporting may include a traveling software and/or application, a vehicle scheduling software and/or application, a mapping software and/or application, etc.

One of ordinary skill in the art would understand that when an element of the device sharing system 100 performs, the element may perform through electrical signals and/or electromagnetic signals. For example, when a terminal device 130 processes a task, such as making a determination, unlocking a device 140, the terminal device 130 may operate logic circuits in its processor to process such task. When the terminal device 130 transmits out a query (e.g., information relating to a location of a device 140) to the server 110, a processor of the terminal device 130 may generate electrical signals encoding the query. The processor of the terminal device 130 may then transmit the electrical signals to an output port. If the terminal device 130 communicates with the server 110 via a wired network, the output port may be physically connected to a cable, which further transmits the electrical signal to an input port of the server 110. If the terminal device 130 communicates with the server 110 via a wireless network, the output port of the terminal device 130 may be one or more antennas, which convert the electrical signals to electromagnetic signals. Similarly, a device 140 may process a task through operation of logic circuits in its processor, and receive an instruction and/or service order from the server 110 via electrical signals or electromagnet signals. Within an electronic device, such as the terminal device 130, the device 140, and/or the server 110, when a processor thereof processes an instruction, transmits out an instruction, and/or performs an action, the instruction and/or action is conducted via electrical signals. For example, when the processor retrieves data (e.g., a plurality of user profiles) from a storage medium (e.g., the storage device 160), it may transmit out electrical signals to a reading device of the storage medium, which may read structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
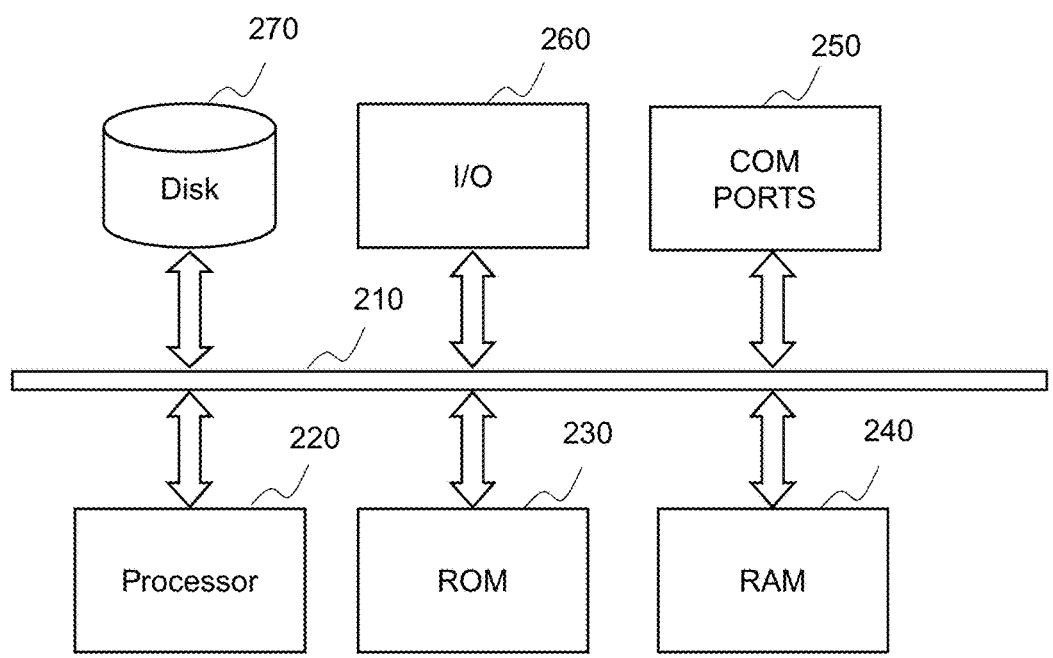
FIG. 2 is a schematic diagram illustrating hardware and/or software components of an exemplary computing device according to some embodiments of the present disclosure.

FIG. 2 a schematic diagram illustrating hardware and/or software components of an exemplary computing device according to some embodiments of the present disclosure. The computing device 200 may be a general purpose computer or a special purpose computer. The computing device 200 may be used to implement any component of the device sharing system 100 as described herein. For example, the processing engine 112 of the server 110, and/or the terminal device 130 may be implemented on the computing device 200, via its hardware, software program, firmware, or a combination thereof. Although only one such computer is shown for convenience, the computer functions related to the device sharing service as described herein may be implemented in a distributed manner on a number of similar platforms to distribute the processing load.

The computing device 200, for example, may include COM ports 250 connected to and from a network (e.g., the network 120) connected thereto to facilitate data communications. The computing device 200 may also include a processor 220 for executing program instructions to perform the functions of the server 110 described herein. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, the RAM 240, and/or another type of non-transitory storage medium to be executed by the processor 220. The methods and/or processes of the present disclosure may be implemented as the program instructions. The computing device 200 also includes an I/O 260, supporting input/output between the computer, the user, and other components therein. The computing device 200 may also receive programming and data via network communications.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, the CPU and/or processor of the computing device 200 may execute both step A and step B. As in another example, step A and step B may also be performed by two different CPUs and/or processors jointly or separately in the computing device 200 (e.g., the first processor executes step A and the second processor executes step B, or the first and second processors jointly execute steps A and B).

Figure 3:
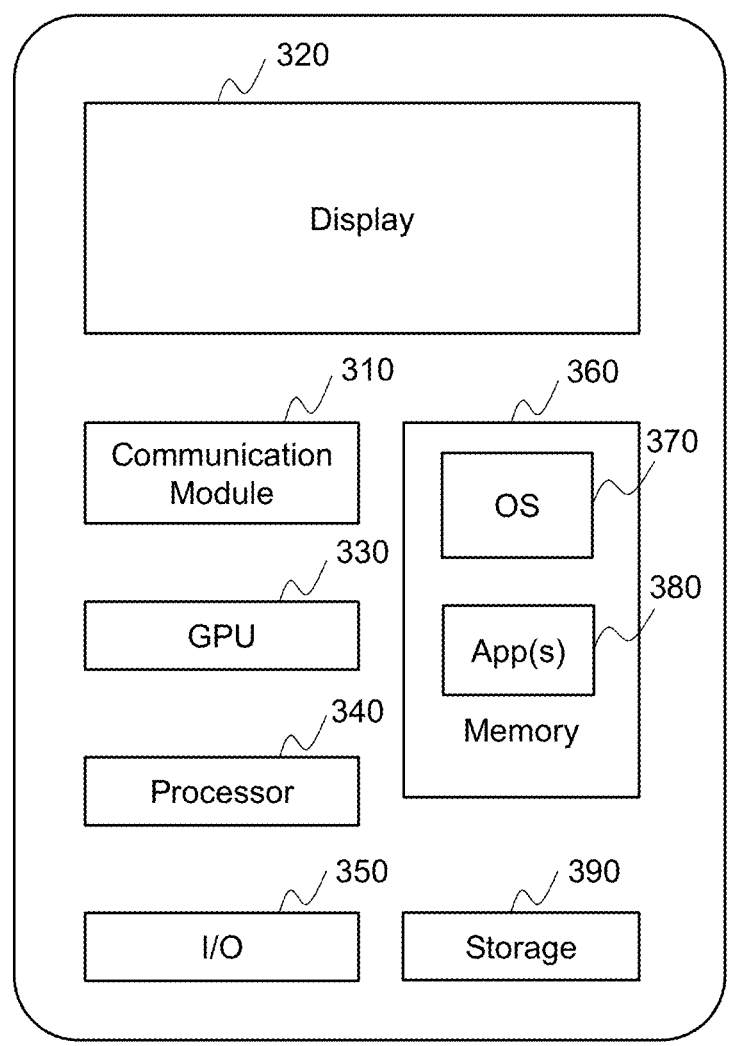
FIG. 3 is a schematic diagram illustrating hardware and/or software components of an exemplary mobile device according to some embodiments of the present disclosure.

FIG. 3 is a schematic diagram illustrating hardware and/or software components of an exemplary mobile device 300 on which a terminal device (e.g., the terminal device 130) may be implemented according to some embodiments of the present disclosure. As illustrated in FIG. 3, the mobile device 300 may include a communication module 310, a display 320, a graphic processing unit (GPU) 330, a processor 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the processor 340. The applications 380 may include a browser or any other suitable apps for transmitting, receiving and presenting information relating to the status of the device 140 (e.g., the location of the device 140) from the server 110. User interactions with the information stream may be achieved via the I/O 350 and provided to the server 110 and/or other components of the device sharing system 100 via the network 120. In some embodiments, a user may borrow (or rent) a device 140 (e.g., a bicycle) via the mobile device 300. The user may also control the lock of the device 140 via the mobile device 300. For example, the user may input an instruction to lock the device 140 via the mobile device 300.

Figure 4:
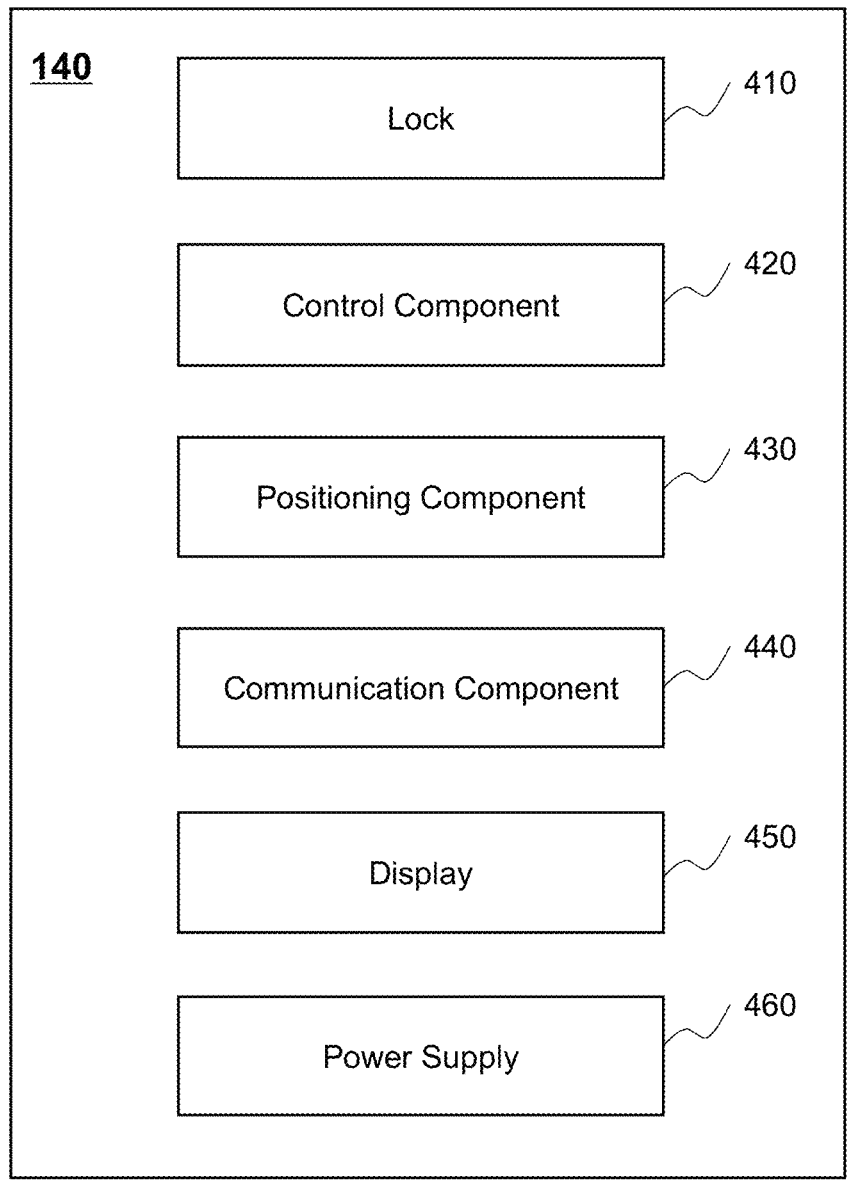
FIG. 4 is a schematic diagram illustrating hardware and/or software components of an exemplary device according to some embodiments of the present disclosure.

FIG. 4 is a schematic diagram illustrating hardware and/or software components of an exemplary device 140 according to some embodiments of the present disclosure. The device 140 may include a lock 410, a control component 420, a positioning component 430, a communication component 440, a display 450, and a power supply 460.

The lock 410 may be configured to secure the device 140. For example, the device 140 may be a bicycle, and the lock 410 may be configured to lock one or more wheels of the bicycle. In some embodiments, the lock 410 may be configured to secure the bicycle to a fixed object such as a bicycle lock pillar or a rack. The lock 410 may include any combination of mechanisms to implement the function thereof. For example, the lock 410 may include a mechanical lock or an electronic lock. In some embodiments, the device 140 and the lock 410 may be separate parts that are mechanically connected to each other. For example, the device 140 and the lock 410 may be separate parts, and the lock 410 may be mounted on the device 140. Additionally or alternatively, the device 140 and the lock 410 may form an integral device.

The control component 420 may control operations of other components of the device 140 (e.g., the lock 410, the positioning component 430, and/or the communication component 440). For example, the control component 420 may open the lock 410 (i.e., releasing the vehicle) and/or close the lock 410 (i.e., locking the vehicle) in response to instructions from the server 110 and/or the terminal device 130.

In some embodiments, the control component 420 include but is not limited to a central processing unit (CPU), an application-specific integrated circuit (ASIC), an application specific instruction set processor (ASIP), a physics processing unit (PPU), a digital processing processor (DSP), a field-programmable gate array (FPGA), a programmable logic device (PLD), a processor, a microprocessor, a controller, a microcontroller, or the like, or any combination thereof.

The positioning component 430 may communicate with the positioning device 170 of the device sharing system 100 for locating or tracking a position of the device 140. In some embodiments, a geographical location of the device 140 obtained by the positioning component 430 may be transmitted, via the communication component 440 or the network 120, to the server 110.

The communication component 440 may facilitate communications among the device 140, the terminal device 130, and/or the server 110. For example, if a distance between the geographical location of the device 140 and a geographical location of a user terminal (e.g., the terminal device 130 or a virtual parking region 150 meets a criterion, the communication component 440 may receive information from and/or transmit information to the user terminal or the virtual parking region. The received and/or transmitted information may include information associated with the device 140, information associated with the user terminal or the virtual parking region 150, environmental information, advertisement information, or the like, or any combination thereof. The communication component 440 may utilize various wireless technologies such as a cellular communication technology (e.g., GSM, CDMA, 2G, 3G, 4G), a short range radio communication technology (e.g., BLUETOOTH, NFC, ZIGBEE, a wireless fidelity (WIFI) technology, an infrared data association (IrDA) technology), narrow band internet of things (NB-IoT), lower-power wide-area network (LPWAN) (e.g., LoRa), etc. In some embodiments, the control component 420, the positioning component 430, and/or the communication component 440 may be integrated into the lock 410.

The display 450 may display information relating to the device 140. In some embodiments, the device 140 may be a vehicle (e.g., a bicycle) in a vehicle sharing system. The display 450 may display information relating to the vehicle when a user is riding the vehicle. The information may include a navigation map, a riding speed, a riding distance, etc. In some embodiments, the display 450 may also display advertisements, news, traffic, weather, etc. In some embodiments, the display 450 may provide an interactive interface for the user. For example, the user riding a bicycle may select a navigation route from a plurality of routes shown on the display 450. The display 450 may include a liquid crystal display (LCD), a light emitting diode (LED)-based display, a flat panel display or curved screen, a television device, a cathode ray tube (CRT), or the like, or any combination thereof. In some embodiments, the display 450 may be integrated with the lock 410.

The power supply 460 may provide the power for operations of components of the device 140 (e.g., the control component 420, the positioning component 430, the communication component 440, the display 450). The power supply 460 may include a battery charged by solar energy, kinetic energy (e.g., during a ride of the vehicle, the battery may be charged), wind energy, mechanical energy, etc. In some embodiments, the power supply 460 may be a 18650 battery. In some embodiments, the device 140 may include other components, for example, a moving component (e.g., a pedal, a wheel), a gearing component (e.g., a bicycle chain), an arresting component (e.g., a brake), an alarming component (e.g., a bell), or the like, or any combination thereof.

It should be noted that the description of the device 140 is intended to be illustrative, and not limit the scope of the present disclosure. Many alternatives, modifications, and variations will be apparent to those skilled in the art. The features, structures, methods, and characteristics of the exemplary embodiments described herein may be combined in various ways to obtain additional and/or alternative exemplary embodiments. For example, the control component 420, the positioning component 430, the communication component 440, the display 450, and/or power supply 460 may be integrated into the lock 410. As another example, the device 140 or the lock 410 may include any other units, for example, a storage component configured to store information (e.g., instructions, data, programs), or a processing component configured to process the information when executes, for example, instruction stored in the storage component.

Figure 5:
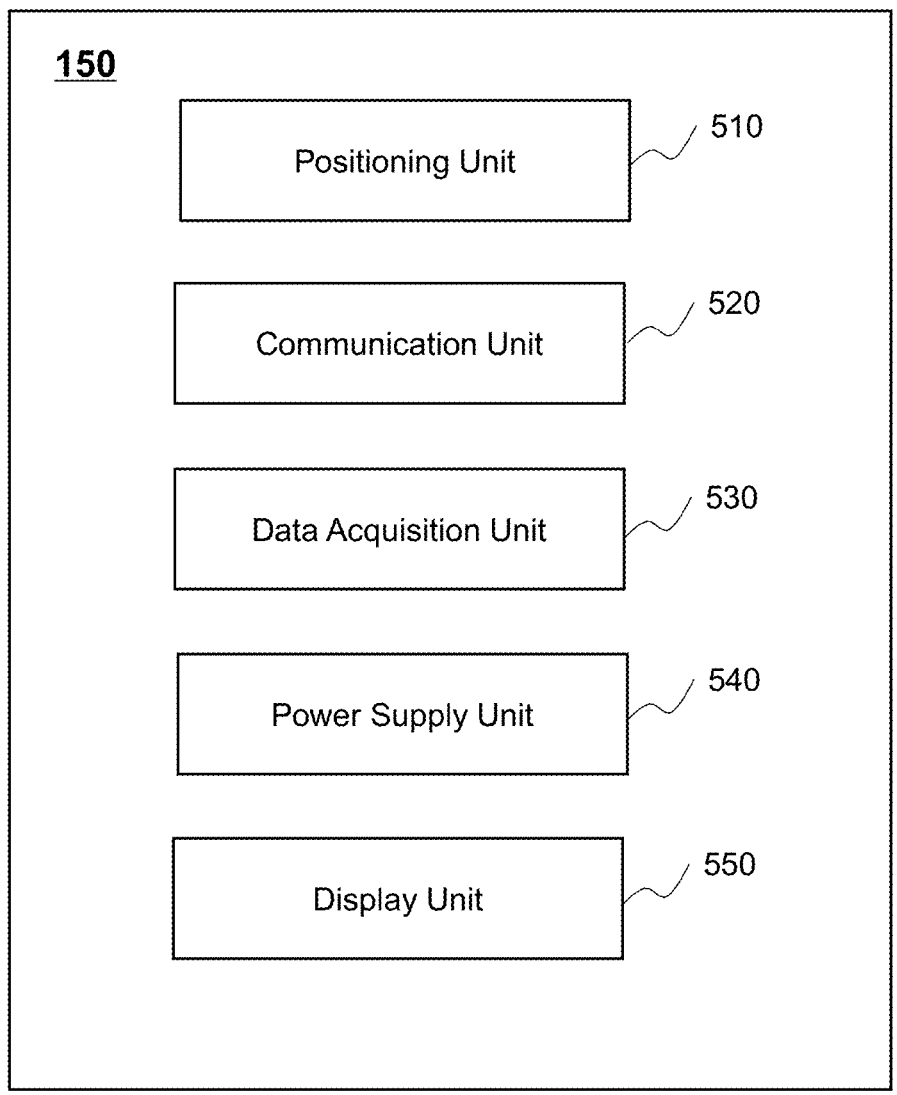
FIG. 5 is a schematic diagram illustrating hardware and/or software components of an exemplary virtual parking region according to some embodiments of the present disclosure.

FIG. 5 is a schematic diagram illustrating hardware and/or software components of an exemplary virtual parking region 150 according to some embodiments of the present disclosure.

In some embodiments, as shown in FIG. 5, the virtual parking region 150 may include a positioning unit 510, a communication unit 520, a data acquisition unit 530, a power supply unit 540, and a display unit 550. In some embodiments, the units 510-550 may be installed in a fixed place of the virtual parking region 150. In some embodiments, the units 510-550 may be movable.

The positioning unit 510 may be configured to locate a geographical location. The geographical location may include a geographical location associated with the virtual parking region 150, and/or a geographical location of the device 140. For example, the positioning unit 510 may communicate with the positioning device 170 for locating the geographical location of the positioning unit 510 (also referred as the geographical location associated with the virtual parking region 150) using various positioning technologies. The positioning technologies may be based on a global positioning system (GPS), a global navigation satellite system (GLONASS), a compass navigation system (COMPASS), a Galileo positioning system, a quasi-zenith satellite system (QZSS), a wireless fidelity (WIFI) positioning technology, or the like, or any combination thereof. As another example, the positioning unit 510 may include a BLUETOOTH positioning module (not shown in FIG. 5) configured to locate the geographical location of the device 140. When a distance between the positioning unit 510 and the device 140 is lower than a threshold distance, the BLUETOOTH positioning module of the positioning unit 510 may communicate with a BLUETOOTH positioning module installed on the device 140 (e.g., a bicycle) for locating the geographical location of the device 140. The threshold distance may be determined based on a BLUETOOTH standard including, for example, BLUETOOTH 1.0, BLUETOOTH 2.0, BLUETOOTH 3.0, BLUETOOTH 4.0, BLUETOOTH 5.0, etc. Merely by way of example, the threshold distance may be 100 meters, 50 meters, 25 meters, 10 meters, 5 meters, 2.5 meters, 1 meter, etc. In some embodiments, the BLUETOOTH positioning module of the positioning unit 510 may be an IBEACON device using a BLUETOOTH low energy technology.

The communication unit 520 may facilitate communications among the virtual parking region 150, the terminal device 130, the device 140, and/or the server 110. The communication unit 520 may utilize various wireless technologies such as a cellular communication technology (e.g., GSM, GPRS, CDMA, 2G, 3G, 4G), a short range radio communication technology (e.g., BLUETOOTH, NFC, ZIGBEE, a wireless fidelity (WIFI) technology, an infrared data association (IrDA) technology), narrow band internet of things (NB-IoT), lower-power wide-area network (LPWAN) (e.g., LoRa), etc.

In some embodiments, the communication unit 520 may receive the geographical location associated with the virtual parking region 150 from the positioning unit 510. The communication unit 520 may then transmit the geographical location associated with the virtual parking region 150 to the server 110 via, for example, the network 120. In some embodiments, the communication unit 520 may communicate with the terminal device 130. For example, the communication unit 520 may receive a geographical location of the terminal device 130 determined by a positioning component of the terminal device 130 (e.g., a GPS module). When a distance between the geographical location associated with the virtual parking region 150 and the geographical location of the terminal device 130 is less than a threshold distance, the communication unit 520 may transmit information (e.g., advertisements, news, or weather information) to the terminal device 130. The threshold distance may be a value according to a default setting of the device sharing system 100 or set by a user. Merely by way of example, the threshold distance may be 100 meters, 50 meters, 25 meters, 10 meters, 5 meters, 2.5 meters, 1 meter, etc.

The data acquisition unit 530 may acquire data relating to the virtual parking region 150. The data may include one or more environmental parameters relating to the virtual parking region 150. The one or more environmental parameters may include a temperature parameter, a humidity parameter, a wind speed parameter, an air pollution index (e.g., an index of PM2.5), etc. The data acquisition unit 530 may include one or more sensors for acquiring the environmental parameters such as a temperature sensor for the temperature parameter, a humidity sensor for the humidity parameter, a wind sensor for the wind speed parameter, a dust sensor for the air pollution index, etc. The data acquisition unit 530 may also transmit the one or more environmental parameters relating to the virtual parking region 150 to the communication unit 520. The communication unit 520 may transmit the one or more environmental parameters relating to the virtual parking region 150 to the server 110 via, for example, the network 120. The server 110 may generate environmental information based on the environmental parameters. The environmental information may be a weather forecast, a gale warning, an air pollution warning, etc. The server 110 may transmit the environmental information to the terminal device 130, the device 140, the server 110, the storage device 160, or a weather service website.

The power supply unit 540 may provide the power for operations of the components of the virtual parking region 150 (e.g., the positioning unit 510, the communication unit 520, or the data acquisition unit 530), the device 140 located in the virtual parking region 150, and/or a user terminal (e.g., the terminal device 130) of a user. The power supply unit 540 may include a power generator charged by solar energy, wind energy, mechanical energy, etc. For example, the power generator may be a solar panel that converts solar energy into electric energy. The power supply unit 540 may also include a power charging block configured to output the power generated by the power generator. For example, the power charging block may include one or more electromagnetic coils that charge the user terminal equipped with electromagnetic coils or the device 140 equipped with electromagnetic coils. As another example, the power charging block may include one or more output ports through which the user terminal or the device 140 may be charged. In some embodiments, the output ports may be a socket, an interface, etc.

In some embodiments, the virtual parking region 150 may display information (e.g., advertisements, news, or weather information) through the display unit 550. For example, the display unit 550 may be a 3D holographic projector. The 3D holographic projector may display to a user the information based on a 3D holographic projection technique.

It should be noted that the description of the virtual parking region 150 in FIG. 5 is intended to be illustrative, and not limit the scope of the present disclosure. Many alternatives, modifications, and variations will be apparent to those skilled in the art. The features, structures, methods, and characteristics of the exemplary embodiments described herein may be combined in various ways to obtain additional and/or alternative exemplary embodiments. For example, the positioning unit 510, the communication unit 520, the data acquisition unit 530, the power supply unit 540, and/or the display unit 550 may be optional. As another example, the virtual parking region 150 may include any other units, for example, a boundary line configured to define the border of virtual parking region 150.

Figure 6:
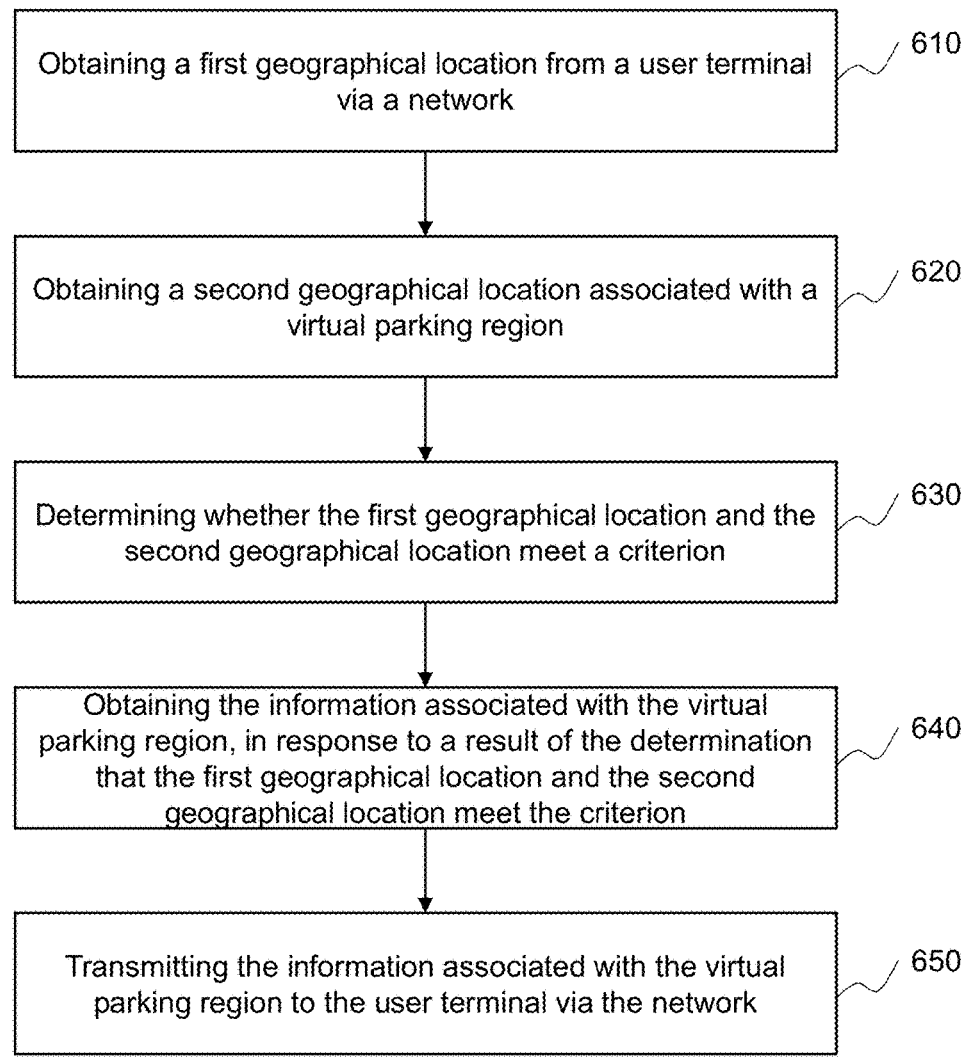
FIG. 6 is a flowchart illustrating an exemplary process for determining a virtual parking region according to some embodiments of the present disclosure.

FIG. 6 is a flowchart illustrating an exemplary process for determining a virtual parking region according to some embodiments of the present disclosure. In some embodiments, one or more operations of the process 600 illustrated in FIG. 6 may be executed by one or more components of the device sharing system 100. For example, the process 600 illustrated in FIG. 6 may be implemented as a set of instructions stored in the storage device 160. The server 110, the processing engine 112, the processor 220 of the computing device 200 illustrated in FIG. 2, and/or the processor 340 of the mobile device 300 illustrated in FIG. 3 may execute the set of instructions and may accordingly be directed to perform the process 600. For illustration purposes, the implement of the process 600 in the processing engine 112 is described herein as an example, but the process 600 can also be similarly implemented in the processor 220 of the computing device 200 and/or the processor 340 of the mobile device 300.

In 610, the processing engine 112 may obtain a first geographical location from a user terminal via a network. The first geographical location may refer to a geographical location of the user terminal. The user terminal may include the terminal device 130, the mobile device 300, or the like. In some embodiments, the processing engine 112 may obtain the first geographical location from the terminal device 130 via the network 120. A positioning component of the terminal device 130 (e.g., the communication module 310 in the mobile device 300) may communicate with the positioning device 170 for locating the first geographical location. The terminal device 130 may transmit the first geographical location to the processing engine 112 via the network 120.

In some embodiments, the processing engine 112 may obtain the first geographical location from the terminal device 130 after receiving an instruction from the terminal device 130. The instruction may include an instruction to use (and/or unlock) a device (e.g., the device 140), or an instruction to return (and/or lock) a device. For example, the terminal device 130 may receive input from a user of the terminal device 130 relating to the instruction to use (and/or unlock) a vehicle. The terminal device 130 may transmit the instruction to use (and/or unlock) a vehicle to the processing engine 112 via the network 120. After receiving the instruction to use (and/or unlock) a vehicle from the terminal device 130, the processing engine 112 may obtain the first geographical location of the terminal device 130 determined by the positioning component of the terminal device 130 from the terminal device 130.

In 620, the processing engine 112 may obtain a second geographical location associated with a virtual parking region 150. In some embodiments, the virtual parking region 150 may include a positioning unit and a communication unit (e.g., the positioning unit 510 and the communication unit 520 shown in FIG. 5). The second geographical location associated with the virtual parking region 150 may refer to a geographical location determined by the positioning unit 510. The processing engine 112 may receive the geographical location determined by the positioning unit 510 from the communication unit 520 via, for example, the network 120.

In some embodiments, the geographical location associated with the virtual parking region 150 may include a geographical location of an entity or object (e.g., a pillar, a lamp, a tree, a bus stop sign, a pole, or the like, or any combination thereof) located in the virtual parking region 150. The positioning unit 510 may locate the geographical location of the object and transmit the geographical location of the object to the processing engine 112. In some embodiments, the object may be movable. The positioning unit 510 may transmit the geographical location to the processing engine 112 each time the geographical location of the object moves or is moved. In some embodiments, the processing engine 112 may obtain the geographical location of the entity or object from storage (e.g., the storage device 160, or a storage of the processing engine 112). The geographical location of the virtual parking region 150 may be estimated by a person and pre-stored in the storage.

In some embodiments, the processing engine 112 may obtain the second geographical location associated with the virtual parking region 150 based on geographical locations of one or more devices 140 located in the virtual parking region 150. The processing engine 112 may obtain the geographical locations of the one or more devices 140 determined by the positioning components 430 of the one or more devices 140 from the one or more devices 140 via, for example, the network 120. The processing engine 112 may then determine the second geographical location associated with the virtual parking region 150 based on the geographical locations of the one or more devices 140.

In some embodiments, the device 140 may be a vehicle in a vehicle sharing system. The virtual parking region 150 may be a region configured to park vehicles. The virtual parking region 150 may include parking space for parking of the vehicles. The parking space may include designated parking space or non-designated parking space or a combination thereof. The designated parking space may include parking lots for the parking of the vehicles. The non-designated parking space may include no parking lot, and a vehicle may be parked anywhere in the non-designated parking space.

In some embodiments, the processing engine 112 may obtain a plurality of second geographical locations associated with a plurality of virtual parking regions 150. For example, based on the first geographical location of the user terminal, the processing engine 112 may select the plurality of virtual parking regions 150 that are near the user terminal. For example, if the user is at point A, the processing engine may select all the virtual parking regions 150 covered by a circle with the point A as center and radius equal to a value (e.g., 1 kilometers, 500 meters, 250 meters).

In 630, the processing engine 112 may determine whether the first geographical location and the second geographical location meet a criterion. The criterion may be that a distance between the first geographical location and the second geographical location is less than a threshold distance. The threshold distance may be a value based on a default setting of the device sharing system 100 or set by a user. Merely by way of example, the threshold distance may be 200 meters, 100 meters, 50 meters, 25 meters, 10 meters, 5 meters, 2.5 meters, 1 meter, etc. In some embodiments, when the processing engine 112 receives an instruction to use (and/or unlock) a vehicle from the terminal device 130 and obtain the first geographical location of the terminal device 130, the processing engine 112 may determine a virtual parking region 150 according to the instruction. The processing engine 112 may determine the virtual parking region 150 based on a result of the determination that the distance between the first geographical location and the second geographical location is less than the threshold distance.

In 640, the processing engine 112 may obtain the information associated with the virtual parking region 150, in response to a result of the determination that the first geographical location and the second geographical location meet the criterion in 630. In some embodiments, the device 140 may be a vehicle in a vehicle sharing system. The information associated with the virtual parking region 150 may include information relating to parking space in the virtual parking region 150. The information relating to the parking space in the virtual parking region 150 may include the number of vehicles in the virtual parking region 150, a location of at least one of vehicles in the virtual parking region 150, the amount of parking space in the virtual parking region 150, a location of parking space in the virtual parking region 150, the capacity of the virtual parking region 150 (e.g., the number of vehicles that the virtual parking region 150 can accommodate), or vacant regions for vehicles in the virtual parking region 150, etc.

In some embodiments, the virtual parking region 150 may include an image capture device (e.g., a camera). The image capture device may record scene information in the virtual parking region 150 and transmit the scene information to the processing engine 112 via, for example, the network 120. The scene information may be images about the virtual parking region 150 that may include information such as vehicles in the virtual parking region 150, parking space in the virtual parking region 150, vacant regions in the virtual parking region 150, etc. The processing engine 112 may determine, based on the scene information, the information associated with the virtual parking region 150 (e.g., the number of vehicles available, locations of available vehicles, the number of vacant parking lots in the parking space, locations of parking space in the virtual parking region 150, or the capacity of the virtual parking region 150 (e.g., the number of vehicles that the virtual parking region 150 can accommodate), vacant regions for vehicles in the virtual parking region 150).

In some embodiments, the device 140 may be a vehicle in a vehicle sharing system. The vehicles in the virtual parking region 150 may include a positioning component (e.g., the positioning component 430) configured to communicate with the positioning device 170 for locating the vehicles. The communication component of the vehicles (e.g., the communication component 440) may transmit the locations of the vehicles to the processing engine 112 via, for example, the network 120. Thus, the processing engine 112 may obtain the number of the vehicles and/or the vehicles in the virtual parking region 150. Similarly, each parking lot in a designated parking space of the virtual parking region 150 may include a positioning unit and a communication unit. The positioning unit of the parking lot may communicate with the positioning device 170 for determining a location of the parking lot. The communication unit of the parking lot may transmit the location of the parking lot to the processing engine 112 via, for example, the network 120. The communication unit of the parking lot may also transmit to the processing engine 112 the status information determined by the parking lot. The status information may include information about whether the parking lot is vacant or occupied with a vehicle. The processing engine 112 may determine the number of vacant parking lots, and/or the locations of the vacant parking lots based on information (e.g., locations, status information) received from the parking lots.

In some embodiments, the virtual parking region 150 may include a positioning unit (e.g., the positioning unit 510 illustrated in FIG. 5) and a communication unit (e.g., the communication unit 520 illustrated in FIG. 5). For example, the positioning unit 510 may communicate with vehicles available in the virtual parking region 150 (e.g., through BLUETOOTH positioning technology) for determining locations of the vehicles. The communication unit 520 may transmit the locations of the vehicles to the processing engine 112. The processing engine 112 may determine the number of the vehicles available based on the locations of the vehicles. As another example, the positioning unit 510 may communicate with parking space in the virtual parking region 150 (e.g., through BLUETOOTH positioning technology) for determining locations of the parking space. The parking space may transmit a status information of the parking space to the communication unit 520. The status information of the parking space may include information of whether the parking space is vacant or occupied with one or more vehicles. The communication unit 520 may transmit information such as the locations of the vehicles available, locations of parking space, and/or status information of parking space in the virtual parking region 150 to the processing engine 112. The processing engine 112 may determine the number of vacant parking space or the locations of the vacant parking space based on the information received from the communication unit 520.

The processing engine 112 may supervise the virtual parking region 150 based on the information associated with the virtual parking region 150. In some embodiments, the processing engine 112 may supervise the virtual parking region 150 based on the information relating to the parking space in the virtual parking region 150. Merely by way of example, the processing engine 112 may determine that the number of vehicles in a virtual parking region 150-1 is more than the number of vehicles in a virtual parking region 150-2 and the number of vacant parking lots in a designated parking space of the virtual parking region 150-1 is less than the number of vacant parking lots in a designated parking space of the virtual parking region 150-2. For non-designated space, the processing engine may determine an approximate number of parking lots according to, for example, an image from the image capture device in the virtual parking region 150. The processing engine 112 may also determine that the location of the virtual parking region 150-1 is near the location of the virtual parking region 150-2. In this scenario, the processing engine 112 may determine that the virtual parking region 150-1 is in a crowded condition compared with the virtual parking region 150-2. The processing engine 112 may transmit the information relating to the parking space in the virtual parking region 150 and/or scheduling information to a terminal (e.g., the computing device 200, or the mobile device 300) of a working staff. The scheduling information may be generated according to the information relating to the parking space in the virtual parking region 150. For example, the scheduling information may include instructions to adjust the number of vehicles in the virtual parking region 150-1 and the virtual parking region 150-2. The working staff may move some of the vehicles in the virtual parking region 150-1 to in the virtual parking region 150-2 according to the scheduling information.

In some embodiments, the processing engine 112 may supervise the virtual parking region 150 based on the information relating to the parking space of the virtual parking region 150. Merely by way of example, the capacity of a virtual parking region 150-1 may be 500 vehicles and the capacity of a virtual parking region 150-2 may be 300 vehicles. The location of the virtual parking region 150-1 may be near the location of the virtual parking region 150-2. The processing engine 112 may determine that the number of available vehicles in the virtual parking region 150-1 is less than 10, and the number of available vehicles in the virtual parking region 150-2 is 290. The processing engine 112 may generate scheduling information (e.g., instructions to transport a certain number (e.g., 140) of vehicles in the virtual parking region 150-2 to the virtual parking region 150-2). The processing engine 112 may transmit the information relating to the parking space in the virtual parking region 150 and/or the scheduling information to terminals of a working staff, and the working staff may move 140 vehicles from the virtual parking region 150-2 to the virtual parking region 150-1.

In 650, the processing engine 112 may transmit the information associated with the virtual parking region 150 to the user terminal (e.g., the terminal device 130) via the network 120. The processing engine 112 may also transmit navigation information associated with the virtual parking region 150 to the user terminal (e.g., the terminal device 130) via the network 120. The navigation information may include the second geographical location associated with the virtual parking region 150, a navigation route from the geographical location of the user terminal to the second geographical location, a period for walking from the geographical location of the user terminal to the second geographical location, etc.

It should be noted that the above description of the process 600 is merely provided for illustration, and not intended to limit the scope of the present disclosure. For persons having ordinary skills in the art, multiple variations and modifications may be made to the process 600 under the teachings of the present disclosure. However, those variations and modifications do not depart from the scope of the present disclosure. For example, the order of operation 610 and operation 620 may be reversed. The processing engine 112 may obtain the second geographical location associated with the virtual parking region 150 in 610 and obtain the first geographical location from the user terminal in 620.

Figure 7:
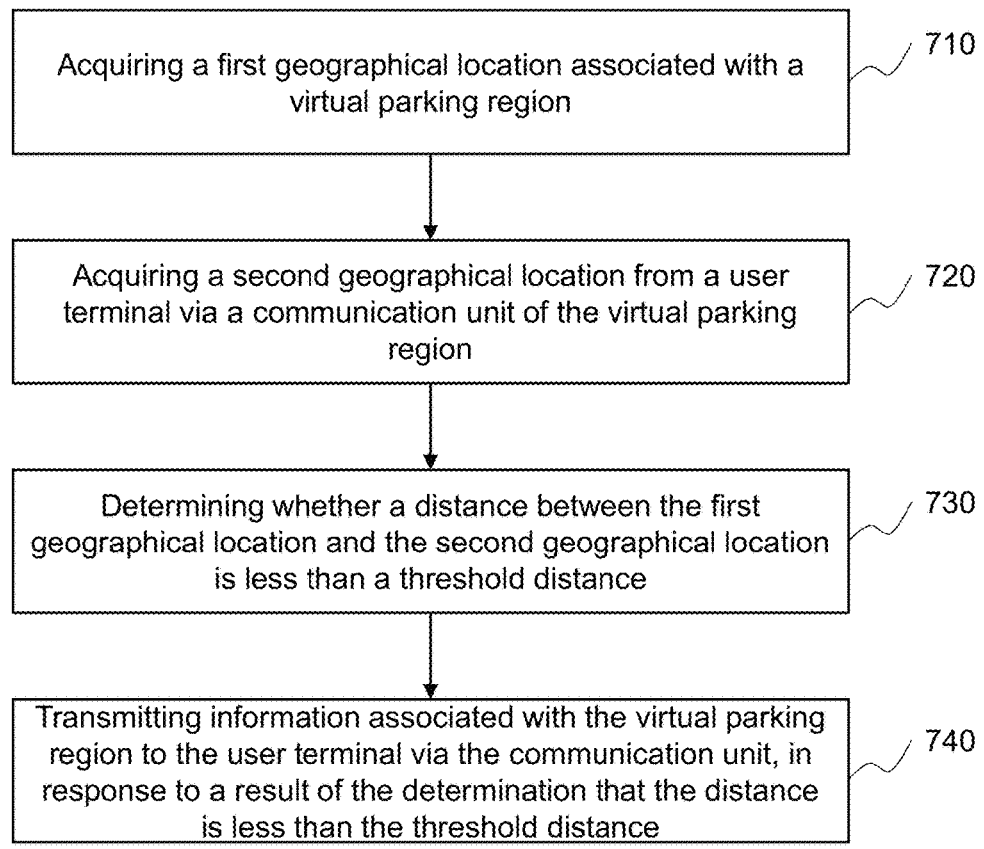
FIG. 7 is a flowchart illustrating an exemplary process for transmitting information associated with a virtual parking region according to some embodiments of the present disclosure.

FIG. 7 is a flowchart illustrating an exemplary process for transmitting information by a virtual parking region according to some embodiments of the present disclosure. In some embodiments, one or more operations of the process 700 illustrated in FIG. 7 may be executed by one or more components of the device sharing system 100. For example, the process 700 illustrated in FIG. 7 may be implemented by one or more units of the virtual parking region 150 shown in FIG. 5.

In 710, the positioning unit 510 may acquire a first geographical location associated with a virtual parking region 150. In some embodiments, the device 140 may be a vehicle in a vehicle sharing system. The virtual parking region 150 may be a region configured to park vehicles. The virtual parking region 150 may include parking space for parking of the vehicles. The parking space may include designated parking space or non-designated parking space or a combination thereof. The designated parking space may include parking lots for the parking of the vehicles. The non-designated parking space may include no parking lot, and a vehicle may be parked anywhere in the non-designated parking space. The first geographical location may refer to a location associated with the virtual parking region 150. Merely by way of example, the first geographical location may be at least one location of the positioning unit 510, the communication unit 520, the data acquisition unit 530, the power supply unit 540, or the display unit 550 of the virtual parking region 150. The positioning unit 510 may communicate with the positioning device 170 for locating the first geographical location.

In 720, the virtual parking region 150 may acquire a second geographical location from a user terminal via a communication unit of the virtual parking region 150. The second geographical location may be the geographical location of the user terminal. The user terminal may include, for example, the terminal device 130, the mobile device 300, or the like. The user terminal may determine the second geographical location via the positioning component of the user terminal (e.g., a GPS unit). The communication unit may include the communication unit 520. For example, the communication unit 520 may communicate with the user terminal to acquire the second geographical location. The communication unit 520 may communicate with the user terminal utilizing various wireless technologies including such as a cellular communication technology (e.g., GSM, GPRS, CDMA, 2G, 3G, 4G), a short range radio communication technology (e.g., BLUETOOTH, NFC, ZIGBEE, a wireless fidelity (WIFI) technology, an infrared data association (IrDA) technology), narrow band internet of things (NB-IoT), lower-power wide-area network (LPWAN) (e.g., LoRa), etc. Merely by way of example, the communication unit 520 may include a short range radio communication unit (e.g., a BLUETOOTH communication unit, or a WIFI communication unit) configured to acquire the second geographical location from the user terminal.

In 730, the virtual parking region 150 may determine whether a distance between the first geographical location and the second geographical location is less than a threshold distance. The virtual parking region 150 may determine the threshold distance according to a default setting of the device sharing system 100 or set by a user. Merely by way of example, the threshold distance may be 100 meters, 50 meters, 25 meters, 10 meters, 5 meters, 2.5 meters, 1 meter, etc.

In 740, the virtual parking region 150 may transmit, in response to a result of the determination that the distance is less than the threshold distance, information associated with the virtual parking region 150 to the user terminal via the communication unit 520. In some embodiments, the device 140 may be a vehicle in a vehicle sharing system. The information associated with the virtual parking region 150 may include information relating to parking space in the virtual parking region 150, service information, etc. The information relating to the parking space in the virtual parking region 150 may include the number of vehicles in the virtual parking region 150, a location of at least one of vehicles in the virtual parking region 150, the amount of parking space in the virtual parking region 150, a location of parking space in the virtual parking region 150, the capacity of the virtual parking region 150 (e.g., the number of vehicles that the virtual parking region 150 can accommodate), or vacant regions for vehicles in the virtual parking region 150, etc. The service information may include advertisements, news, traffic information, weather information, shopping information (e.g., restaurants, shopping malls) near the virtual parking region 150, etc.

In some embodiments, the virtual parking region 150 may obtain the information associated with the virtual parking region 150 from the server 110 via the network 120. The virtual parking region 150 may include a storage component configured to store the information. In response to a result of the determination that the distance is less than the threshold distance, the virtual parking region 150 may transmit the information stored in the storage component to the user terminal. In some embodiments, a short range radio communication unit (e.g., a BLUETOOTH communication unit, or a WIFI communication unit) of the virtual parking region 150 may transmit, in response to a result of the determination that the distance is less than the threshold distance, the information to the user terminal.

In some embodiments, the virtual parking region 150 may also display, in response to a result of the determination that the distance is less than the threshold distance, the information via one or more display components. For example, the display unit 550 of the virtual parking region 150 may include a 3D holographic projector. The 3D holographic projector may display to a user the information based on a 3D holographic projection technique.

It should be noted that the above description of the process 700 is merely provided for illustration, and not intended to limit the scope of the present disclosure. For persons having ordinary skills in the art, multiple variations and modifications may be made to the process 700 under the teachings of the present disclosure. However, those variations and modifications do not depart from the scope of the present disclosure. For example, the order of operation 710 and operation 720 may be reversed. The processing engine 112 may obtain the second geographical location from the user terminal in 710, then obtain the first geographical location associated with the virtual parking region in 720.

Figure 8:
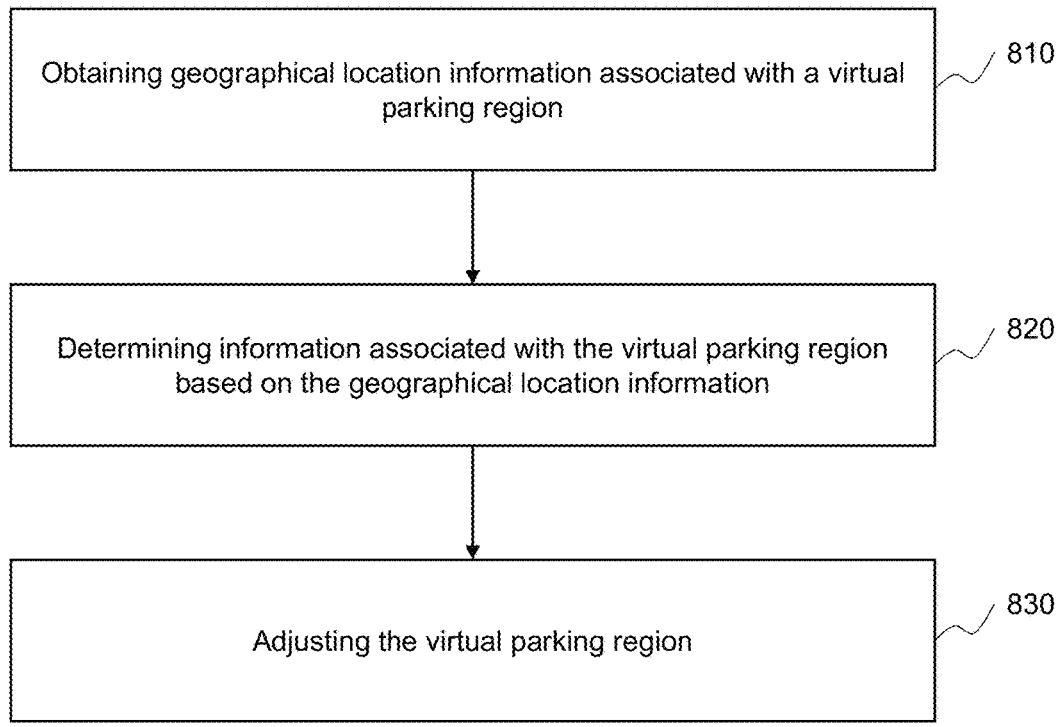
FIG. 8 is a flowchart illustrating an exemplary process for determining a virtual parking region according to some embodiments of the present disclosure.

FIG. 8 is a flowchart illustrating an exemplary process for determining a virtual parking region according to some embodiments of the present disclosure. In some embodiments, one or more operations of the process 800 may be executed by the device sharing system 100. For example, the process 800 illustrated in FIG. 8 may be implemented as a set of instructions stored in the storage device 160. The server 110, the processing engine 112, the processor 220 of the computing device 200 illustrated in FIG. 2, and/or the processor 340 of the mobile device 300 illustrated in FIG. 3 may execute the set of instructions and may accordingly be directed to perform the process 800. For illustration purposes, the implement of the process 800 in the processing engine 112 is described herein as an example, but the process 800 can also be similarly implemented in the processor 220 of the computing device 200 and/or the processor 340 of the mobile device 300. In some embodiments, operation 620 in FIG. 6 may be implemented by performing one or more operations in the process 800.

In 810, the processing engine 112 may obtain geographical location information associated with a virtual parking region 150. In some embodiments, the geographical location information may include geographical locations of one or more devices 140 (e.g., vehicles) located in the virtual parking region 150. The one or more devices 140 may transmit the geographical locations of the one or more devices 140 determined by positioning components 430 of the one or more devices 140 to the processing engine 112 via, for example, the network 120.

In some embodiments, the geographical location information may include a geographical location of a positioning unit of the virtual parking region 150 (e.g., the positioning unit 510 illustrated in FIG. 5). The positioning unit 510 may communicate with the positioning device 170 for locating the virtual parking region 150. A communication unit of the virtual parking region 150 (e.g., the communication unit 520 illustrated in FIG. 5) may transmit the geographical location of the positioning unit 510 of the virtual parking region 150 to the processing engine 112 via, for example, the network 120.

In some embodiments, the geographical location information may include a geographical location of an entity or object (e.g., a pillar, a lamp, a tree, a bus stop sign, a pole, or the like, or any combination thereof) located in the virtual parking region 150. The positioning unit 510 may locate the geographical location of the object and transmit the geographical location of the object to the processing engine 112. In some embodiments, the object may be movable. The positioning unit 510 may transmit the geographical location to the processing engine 112 each time the geographical location of the object moves or is moved. In some embodiments, the processing engine 112 may obtain the geographical location of the entity or object from storage (e.g., the storage device 160, or a storage of the processing engine 112). The geographical location of the virtual parking region 150 may be estimated by a person and pre-stored in the storage.

In some embodiments, the device 140 may be a vehicle in a vehicle sharing system. The virtual parking region 150 may include parking space for parking of the vehicles. The parking space may include designated parking space or non-designated parking space or a combination thereof. For designated parking space, the geographical location information may also include geographical locations of one or more parking lots in the designated parking space of the virtual parking region 150. The one or more parking lots may include positioning units configured to determine the geographical locations of the one or more parking lots and communication units configured to communicate with the server 110. The communication units may transmit to the server 110 the geographical locations of the one or more parking lots.

In 820, the processing engine 112 may determine information associated with the virtual parking region 150 based on the geographical location information. In some embodiments, the device 140 may be a vehicle in a vehicle sharing system. The information associated with the virtual parking region 150 may include information relating to parking space in the virtual parking region 150, a size of the virtual parking region 150, a boundary of the virtual parking region 150, and/or a geographical location associated with the virtual parking region 150. The information relating to the parking space in the virtual parking region 150 may include the number of vehicles in the virtual parking region 150, a location of at least one of vehicles in the virtual parking region 150, the amount of parking space in the virtual parking region 150, a location of parking space in the virtual parking region 150, the capacity of the virtual parking region 150 (e.g., the number of vehicles that the virtual parking region 150 can accommodate), or vacant regions for vehicles in the virtual parking region 150, etc. For example, the processing engine 112 may determine the information associated with the virtual parking region 150 based on the geographical locations of the one or more vehicles parked in the virtual parking region 150. As another example, the processing engine 112 may determine the information associated with the virtual parking region 150 based on the geographical location of the positioning unit 510 and road conditions around the geographical location. The road conditions may include an available zone for parking. Merely by way of example, the virtual parking region 150 may be a square area located along a street. As yet another example, the processing engine 112 may determine the information of the virtual parking region 150 based on the geographical location of the object located in the virtual parking region 150 and road conditions around the geographical location.

In some embodiments, after determining the information associated with the virtual parking region in 820, the processing engine 112 may store the information in storage (e.g., the storage device 160, or a storage of the processing engine 112).

In 830, the processing engine 112 may adjust the virtual parking region 150. In some embodiments, the processing engine 112 may adjust the virtual parking region 150 based on vehicles parked in the virtual parking region 150. For example, the processing engine 112 may enlarge the boundary or the size of the virtual parking region 150, in response to a result of the determination that a certain number of vehicles (e.g., ten vehicles) are parked outside the original range of the virtual parking region 150, and vice versa.

It should be noted that the above description of the process 800 is merely provided for illustration, and not intended to limit the scope of the present disclosure. For persons having ordinary skills in the art, multiple variations and modifications may be made to the process 800 under the teachings of the present disclosure. However, those variations and modifications do not depart from the scope of the present disclosure. For example, operation 830 may be optional.

Figure 9:
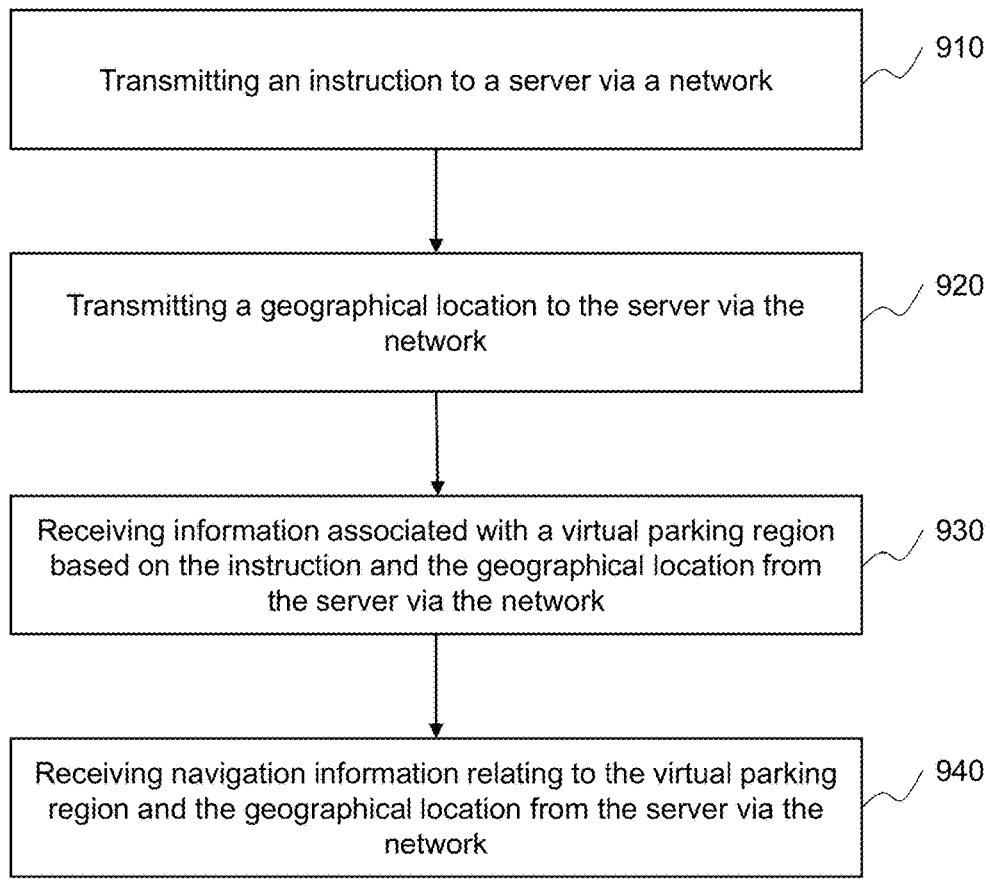
FIG. 9 is a flowchart illustrating an exemplary process for determining a virtual parking region according to some embodiments of the present disclosure.

FIG. 9 is a flowchart illustrating an exemplary process for determining a virtual parking region according to some embodiments of the present disclosure. In some embodiments, one or more operations of the process 900 illustrated in FIG. 9 may be executed by one or more components of the device sharing system 100. For example, the process 900 illustrated in FIG. 9 may be implemented as a set of instructions stored in the storage device 160. The terminal device 130, the processing engine 112, the processor 220 of the computing device 200 illustrated in FIG. 2, and/or the processor 340 of the mobile device 300 illustrated in FIG. 3 may execute the set of instructions and may accordingly be directed to perform the process 900.

In 910, the terminal device 130 may transmit an instruction to a server via a network. In some embodiments, the terminal device 130 may transmit an instruction to the server 110 via the network 120. The instruction may include an instruction to use (and/or open a lock of) a device (e.g., the device 140), or an instruction to return (and/or lock) a device. For example, when a user needs a vehicle for a ride, the terminal device 130 may receive input from the user relating to an instruction to use (and/or open a lock of) a vehicle. The terminal device 130 may transmit the instruction to use (and/or open a lock of) a vehicle to the server 110 via the network 120. As another example, when the user finishes a ride and wants to return a vehicle, the terminal device 130 may receive input from the user relating to an instruction to return (and/or lock) the vehicle. The terminal device 130 may transmit the instruction to return (and/or lock) the vehicle to the server 110 via the network 120.

In 920, the terminal device 130 may transmit a geographical location to the server 110 via the network 120. In some embodiments, the terminal device 130 may transmit a geographical location to the server 110 via the network 120. The geographical location may refer to the geographical location of the terminal device 130. A positioning component of the terminal device 130 (e.g., a GPS module) may communicate with the positioning device 170 for locating the geographical location of the terminal device 130. The terminal device 130 may transmit the geographical location of the terminal device 130 to the server 110 via the network 120.

In 930, the terminal device 130 may receive information associated with a virtual parking region 150 based on the instruction and the geographical location from the server 110 via the network 120. In some embodiments, the terminal device 130 may receive information of the virtual parking region 150 based on the instruction and the geographical location from the server 110 via the network 120.

The processing engine 112 may determine the virtual parking region 150 according to and in response to the instruction received from the terminal device 130. The processing engine 112 may determine the virtual parking region 150 based on a criterion. The criterion may be that a distance between a geographical location associated with the virtual parking region 150 and the geographical location of the terminal device 130 is lower than a threshold distance. The processing engine 112 may determine the threshold distance based on a default setting of the device sharing system 100. In some embodiments, the processing engine 112 may determine that the geographical location associated with the virtual parking region 150 is the closest to the geographical location of the terminal device 130. For example, when the user wants to use (and/or open a lock of) a vehicle and the terminal device 130 transmits the instruction to use (and/or open a lock of) a vehicle to the server 110, the processing engine 112 may determine the virtual parking region 150 that is the closest to the geographical location of the terminal device 130 for the user. The processing engine 112 may also transmit the information of the virtual parking region 150 to the terminal device 130.

In some embodiments, the device 140 may be a vehicle in a vehicle sharing system. The information associated with the virtual parking region 150 may include information relating to parking space in the virtual parking region 150, the geographical location associated with the virtual parking region 150, etc. The information relating to the parking space in the virtual parking region 150 may include the number of vehicles available, locations of the vehicles, the number of vacant parking lots in designated parking space, locations of vacant parking lots in the designated parking space of the virtual parking region 150, the capacity of the virtual parking region 150 (i.e., the number of vehicles that the virtual parking region 150 can accommodate), or vacant regions for vehicles in the virtual parking region 150, etc.

In 940, the terminal device 130 may receive navigation information relating to the virtual parking region 150 and the geographical location from the server 110 via the network 120. The terminal device 130 may receive navigation information relating to the virtual parking region 150 and the geographical location of the terminal device 130 from the server 110 via the network 120. The navigation information may include the geographical location associated with the virtual parking region 150, the geographical location of the terminal device 130, a navigation route from the geographical location of the terminal device 130 to the geographical location associated with the virtual parking region 150, a period for walking from the geographical location of the terminal device 130 to the geographical location associated with the virtual parking region 150, or the like, or any combination thereof. In some embodiments, the terminal device 130 (e.g., via the processor 340) may determine the navigation information based on the geographical location of the terminal device 130 and the information associated with the virtual parking region 150. In some embodiments, the navigation information may be displayed on the terminal device 130. For example, points indicating vehicles in the virtual parking region 150, which may be associated with an electronic map, may be displayed on the terminal device 130. The navigation information may instruct the user to the virtual parking region 150. For example, when the user wants to return (and/or lock) a vehicle, the navigation information may instruct the user to the virtual parking region 150 for the parking of the vehicle.

It should be noted that the above description of the process 900 is provided for illustration, not intended to limit the scope of the present disclosure. For example, operation 910 and operation 920 may be merged into one single step in which the terminal device 130 may transmit the instruction and may transmit the geographical location simultaneously or successively. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device" or "system." Furthermore, aspects of the present disclosure may take the form of a computer program product embodied in one or more non-transitory computer-readable media having computer-readable program code embodied thereon.

A computer-readable signal medium may include a propagated data signal with computer-readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as JAVA, Scala, SMALLTALK, EIFFEL, JADE, EMERALD, C++, C#, VB.NET, Python or the like, conventional procedural programming languages, such as the "C" programming language, VISUAL BASIC, Fortran 2003, PERL, COBOL 2002, PHP, ABAP, dynamic programming languages such as Python, RUBY and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various embodiments. This method of disclosure, however, is not to be interpreted as reflecting an intention that the claimed subject matter requires more features than are expressly recited in each claim. Rather, claimed subject matter lies in less than all features of a single foregoing disclosed embodiment.

We claim:

1. A system, comprising:
a storage device storing a set of instructions; and
a processor in communication with the storage device, wherein when executing the set of instructions, the processor is configured to cause the system to:
obtain, from a user terminal, a first geographical location via a network, the first geographic location being determined by the user terminal according a global positioning system (GPS) signal;
obtain a second geographical location, the second geographic location being associated with a virtual parking region, the virtual parking region including parking space for vehicles, a distance between the first geographical location and the second geographical location being less than a threshold distance;
determine information associated with the virtual parking region based on the second geographical location, the information associated with the virtual parking region including a boundary of the virtual parking region;
transmit, via the network, the information associated with the virtual parking region to the user terminal; and
adjust the boundary of the virtual parking region based on a result of a determination that vehicles are parked outside the boundary of the virtual parking region.

2. The system of claim 1, wherein the second geographical location includes a location of at least one part of the virtual parking region pre-stored in the storage device.

3. The system of claim 1, wherein
the virtual parking region includes a positioning unit; and
the second geographical location includes a geographical location of at least one part of the virtual parking region that is determined by the positioning unit of the virtual parking region.

4. The system of claim 1, wherein the information associated with the virtual parking region further includes information relating to the parking space in the virtual parking region, the information relating to the parking space in the virtual parking region including at least one of: a number count of vehicles in the virtual parking region, a location of at least one of vehicles in the virtual parking region, amount of parking space, or a location of parking space in the virtual parking region.

5. The system of claim 4, wherein the processor is further configured to cause the system to:
transmit, via the network, the information relating to the parking space in the virtual parking region to a terminal of a working staff.

6. The system of claim 1, wherein adjusting the boundary of the virtual parking region based on the result of the determination that vehicles are parked outside the boundary of the virtual parking region comprises:
modifying the boundary of the virtual parking region by adjusting at least one of a shape, a size, or a location of the boundary of the virtual parking region.

7. The system of claim 1, wherein the processor is further configured to cause the system to:
obtain at least one environmental parameter relating to the virtual parking region;
generate environmental information based on the at least one environmental parameter; and
transmit, via the network, the environmental information to the user terminal.

8. The system of claim 1, wherein the parking space includes at least one of designated parking space or non-designated parking space.

9. The system of claim 1, wherein the processor is further configured to cause the system to transmit, via the network, navigation information associated with the virtual parking region to the user terminal.

10. A method for determining a parking region of vehicles, the method being implemented on at least one machine each of which has a storage device and a processor, the method comprising:
obtaining, by the processor, a first geographical location from a user terminal via a network, the first geographical location being determined by the user terminal according a global positioning system (GPS) signal;
obtaining, by the processor, a second geographical location, the second geographic location being associated with a virtual parking region, the virtual parking region including parking space for vehicles, a distance between the first geographical location and the second geographical location being less than a threshold distance;

determining, by the processor, information associated with the virtual parking region based on the second geographical location, the information associated with the virtual parking region including a boundary of the virtual parking region;

transmitting, by the processor, the information associated with the virtual parking region to the user terminal via the network; and adjusting the boundary of the virtual parking region based on a result of a determination that vehicles are parked outside the boundary of the virtual parking region.

11. The method of claim 10, wherein the second geographical location includes a location of at least one part of the virtual parking region pre-stored in the storage device.

12. The method of claim 10, wherein
the virtual parking region includes a positioning unit; and
the second geographical location includes a geographical location of at least one part of the virtual parking region that is determined by the positioning unit of the virtual parking region.

13. The method of claim 10, wherein the information associated with the virtual parking region further includes information relating to the parking space in the virtual parking region, the information relating to the parking space in the virtual parking region including at least one of: a number count of vehicles in the virtual parking region, a location of at least one of vehicles in the virtual parking region, or a location of vacant parking space in the virtual parking region.

14. The method of claim 13, further comprising:
transmitting the information relating to the parking space in the virtual parking region to a terminal of a working staff via the network.

15. The method of claim 10, adjusting the boundary of the virtual parking region based on the result of the determination that vehicles are parked outside the boundary of the virtual parking region comprising:
modifying, by the processor, the boundary of the virtual parking region by adjusting at least one of a shape, a size, or a location of the boundary of the virtual parking region.

16. The method of claim 10, further comprising:
obtaining, by the processor, at least one environmental parameter relating to the virtual parking region;
generating, by the processor, environmental information based on the at least one environmental parameter; and
transmitting, by the processor, the environmental information to the user terminal via the network.

17. The method of claim 10, wherein the parking space includes at least one of designated parking space or non-designated parking space.

18. A non-transitory computer-readable medium embodying a computer program product, the computer program product comprising instructions configured to cause a computing device to:

obtain, from a user terminal, a first geographical location via a network, the first geographic location being determined by the user terminal according a global positioning system (GPS) signal;

obtain a second geographical location, the second geographic location being associated with a virtual parking region, the virtual parking region including parking space for vehicles, a distance between the first geographical location and the second geographical location being less than a threshold distance;

determine information associated with the virtual parking region based on the second geographical location, the information associated with the virtual parking region including a boundary of the virtual parking region;

transmit, via the network, the information associated with the virtual parking region to the user terminal; and adjust the boundary of the virtual parking region based on a result of a determination that vehicles are parked outside the boundary of the virtual parking region.

19. A vehicle having a lock, comprising:
a storage device storing a set of instructions; and
a processor in communication with the storage device, wherein when executing the set of instructions, the processor is configured to cause the vehicle to:
position a first geographical location of the vehicle;
transmit the first geographical location of the vehicle to a server;
obtain from the server, information associated with a virtual parking region in response to a determination determined by the server that a distance between the first geographical location of the vehicle and a second geographical location of the virtual parking region is less than a threshold distance, the information associated with the virtual parking region being determined by the server based on the second geographical location, the information associated with the virtual parking region includes a boundary of the virtual parking region; and
transmit to a user terminal the information associated with the virtual parking region,
wherein the boundary of the virtual parking region is determined by the server by adjusting an original boundary of the virtual parking region based on a result of a determination that the vehicle is parked outside the original boundary of the virtual parking region.

20. The vehicle of claim 19, wherein the information associated with the virtual parking region includes information relating to parking space in the virtual parking region, the information relating to the parking space in the virtual parking region including at least one of: a number count of vehicles in the virtual parking region, a location of at least one of vehicles in the virtual parking region, amount of parking space, or a location of parking space in the virtual parking region.

* * * * *